United States Patent
Lankford et al.

(10) Patent No.: US 10,271,117 B2
(45) Date of Patent: Apr. 23, 2019

(54) ENVIRONMENTAL MONITORING

(71) Applicant: Earthtec Solutions, LLC, Vinceland, NJ (US)

(72) Inventors: David Lankford, Bamberg, SC (US); Francis Thomas Lichtner, Jr., Newark, DE (US)

(73) Assignee: EARTHTEC SOLUTIONS, LLC, Vineland, NJ (US)

( * ) Notice: Subject to any disclaimer, the term of this patent is extended or adjusted under 35 U.S.C. 154(b) by 725 days.

(21) Appl. No.: 14/517,142

(22) Filed: Oct. 17, 2014

(65) Prior Publication Data

US 2015/0061888 A1 Mar. 5, 2015

Related U.S. Application Data

(63) Continuation of application No. 13/443,814, filed on Apr. 10, 2012, now abandoned, and a
(Continued)

(51) Int. Cl.
*A01B 79/00* (2006.01)
*H04Q 9/02* (2006.01)
(Continued)

(52) U.S. Cl.
CPC ............. *H04Q 9/02* (2013.01); *A01B 79/005* (2013.01); *A01C 21/007* (2013.01); *A01G 25/16* (2013.01)

(58) Field of Classification Search
CPC .... A01B 79/005; A01C 21/007; A01D 91/00; A01F 25/00; G06Q 10/06; G06Q 10/08;
(Continued)

(56) References Cited

U.S. PATENT DOCUMENTS 3,508,148 A 4/1970 Enfield
3,967,198 A 6/1976 Gensler
(Continued)

FOREIGN PATENT DOCUMENTS

AU 2011235120 A1 2/2015
EP 2553500 A1 2/2013
(Continued)

OTHER PUBLICATIONS

International Search Report and Written opinion dated May 27, 2011 by the International Searching Authority for International Patent Application No. PCT/US2011/30739, which was filed Mar. 31, 2011 (Inventor—Lankford; Applicant—Earthtec Solutions, LLC) (9 pages).

(Continued)

*Primary Examiner* — Randy Gibson
*Assistant Examiner* — Gedeon M Kidanu
(74) *Attorney, Agent, or Firm* — Ballard Spahr LLP

(57) ABSTRACT

Methods and system for multi-dimensional environmental monitoring, systematic dissection of interpretive relationships and extensive computational analysis, which can be displayed in a visual real-time data-rich web-based configuration called AdviroGuard™ interpretive analysis. By means of building data subsets and in harmonization with the laws of physics contained within a particular environmental medium, strict statistical analysis are applied to produce significant and pertinent information for key decision makers.

15 Claims, 34 Drawing Sheets

Related U.S. Application Data continuation-in-part of application No. PCT/US2011/030739, filed on Mar. 31, 2011.

(60) Provisional application No. 61/473,781, filed on Apr. 10, 2011, provisional application No. 61/319,490, filed on Mar. 31, 2010.

(51) Int. Cl.
*A01G 25/16* (2006.01)
*A01C 21/00* (2006.01)

(58) Field of Classification Search
CPC .. G06Q 10/087; G06Q 10/10; G06Q 30/0283; G06Q 40/04; G06Q 50/02; A01G 1/00; A01G 25/023; A01G 25/16; A01G 25/167; A01G 25/06; B05B 12/04; G05B 19/042; G05B 2219/2625; G05B 15/02; G05D 7/0617; G06N 99/005; G01N 27/223; Y02A 40/238; Y10T 137/1866
See application file for complete search history.

(56) References Cited

U.S. PATENT DOCUMENTS

| | | | |
|---|---|---|---|
| 4,140,421 A | 2/1979 | Lloyd | |
| 4,161,292 A | 7/1979 | Holloway et al. | |
| 5,251,153 A | 10/1993 | Nielsen et al. | |
| 5,404,425 A | 4/1995 | Nguyen et al. | |
| 5,739,031 A | 4/1998 | Runyon | |
| 6,055,480 A | 4/2000 | Nevo et al. | |
| 6,530,160 B1 | 3/2003 | Gookins | |
| 7,039,523 B2 | 5/2006 | Bell | |
| 7,231,298 B2 | 6/2007 | Hnilica-Maxwell | |
| 7,949,433 B2* | 5/2011 | Hern | A01G 25/167 239/63 |
| 8,200,368 B2* | 6/2012 | Nickerson | A01G 25/16 137/78.1 |
| 8,289,035 B1 | 10/2012 | Gensler | |
| 8,682,494 B1* | 3/2014 | Magro | B05B 12/12 239/63 |
| 8,793,024 B1* | 7/2014 | Woytowitz | A01G 25/167 137/78.2 |
| 2002/0014539 A1 | 2/2002 | Pagano et al. | |
| 2002/0173980 A1 | 11/2002 | Daggett et al. | |
| 2003/0009799 P1 | 1/2003 | Khanizadeh | |
| 2003/0042916 A1 | 3/2003 | Anderson | |
| 2003/0109964 A1* | 6/2003 | Addink | A01G 25/16 700/284 |
| 2003/0182259 A1* | 9/2003 | Pickett | A01B 79/005 |
| 2003/0200028 A1 | 10/2003 | Rooney et al. | |
| 2004/0088330 A1* | 5/2004 | Pickett | A01B 79/005 |
| 2004/0145379 A1 | 7/2004 | Buss | |
| 2005/0015287 A1* | 1/2005 | Beaver | G06Q 10/06375 705/7.37 |
| 2005/0156066 A1 | 7/2005 | Ivans | |
| 2005/0216130 A1 | 9/2005 | Clark et al. | |
| 2005/0248455 A1 | 11/2005 | Pope et al. | |
| 2005/0257748 A1 | 11/2005 | Kriesel et al. | |
| 2006/0010967 A1 | 1/2006 | Matsuo | |
| 2006/0102739 A1 | 5/2006 | Ivans | |
| 2006/0131442 A1 | 6/2006 | Ivans | |
| 2006/0271555 A1 | 11/2006 | Beck et al. | |
| 2007/0016334 A1* | 1/2007 | Smith | A01G 25/16 700/284 |
| 2007/0055407 A1 | 3/2007 | Goldberg et al. | |
| 2008/0199359 A1 | 8/2008 | Davis et al. | |
| 2009/0120506 A1 | 5/2009 | Hoch | |
| 2009/0177330 A1 | 7/2009 | Kah, Jr. | |
| 2009/0216661 A1 | 8/2009 | Warner | |
| 2009/0229179 A1 | 9/2009 | Hafeel et al. | |
| 2009/0277506 A1 | 11/2009 | Bradbury et al. | |
| 2010/0036912 A1 | 2/2010 | Rao | |
| 2010/0038440 A1* | 2/2010 | Ersavas | A01G 1/00 236/51 |
| 2010/0094472 A1 | 4/2010 | Woytowitz et al. | |
| 2011/0004578 A1* | 1/2011 | Momma | G06N 99/005 706/12 |
| 2011/0035059 A1 | 2/2011 | Ersavas | |
| 2011/0179978 A1 | 7/2011 | Schmitt | |
| 2012/0239211 A1 | 9/2012 | Walker et al. | |
| 2012/0284264 A1* | 11/2012 | Lankford | A01B 79/005 707/736 |
| 2015/0040473 A1 | 2/2015 | Lankford | |

FOREIGN PATENT DOCUMENTS

| | | |
|---|---|---|
| WO | WO-2000/015987 A1 | 3/2000 |
| WO | WO-2003/0099454 A2 | 12/2003 |
| WO | WO-2011/123653 A1 | 10/2011 |
| WO | WO-2013/012826 A1 | 1/2013 |

OTHER PUBLICATIONS

International Search Report and Written opinion dated Jul. 13, 2012 by the International Searchig Authority for International Patent Applicantion No. PCT/US2012/32939, which was filed Apr. 10, 2012 (Inventor—Lankford; Applicant—Earthtec Solutions, LLC) (7 pages).

International Search Report and Written opinion dated Nov. 8, 2012 by the International Searching Authority for International Patent Application No. PCT/US2012/46980, which was filed Jul. 16, 2012 (Inventor—Lankford; Applicant—Earthtec Solutions, LLC) (11 pages).

Supplemental European Search Report and Written Opinion dated Dec. 19, 2014 by the European Patent Office for European Patent No. 11763440.2, which was published as 2553500 Feb. 6, 2013 (Inventor—Lankford; Applicant—Earthtec Solutions, LLC) (6 pages).

Examination Report dated Feb. 6, 2013 by the Australian Patent Office for Australian Patent No. 2011235120, which was filed Mar. 31, 2011 (Inventor—Lankford; Applicant—Earthtec Solutions, LLC) (4 pages).

Kim, Y. et al., Remote Sensing and Control of an Irrigation System Using a Distributed Wireless Sensor Network. IEEE Transactions on Instrumentation and Measurement. 57(7):1379-87 (2008).

Examination Report dated Aug. 16, 2016 by the Intellectual Property Office of Australia for Australian Patent Application No. 2015200565, which was filed on Feb. 5, 2015 (Inventor—Lankford; Applicant—Earthtec Solutions, LLC) (7 pages).

Communication Pursuant to Article 94(3) EPC dated Mar. 16, 2016 by the European Patent Office for European Patent Application No. 11763440.2, which was filed on Mar. 31, 2011 and published as EP 2553500 on Feb. 6, 2013 (Inventor—Lankford; Applicant—Earthtec Solutions, LLC) (6 pages).

Non-Final Office Action issued on May 9, 2016 by the U.S. Patent and Trademark Office for U.S. Appl. No. 14/232,768, filed Sep. 17, 2014 and published as US 2015/00404473 on Feb. 12, 2015 (Inventor—Lankford et al.; Applicant—Earthtec Solutions) (14 pages).

Response to Non-Final Office Action dated Nov. 9, 2016 by the U.S. Patent and Trademark Office for U.S. Appl. No. 14/232,768, filed Sep. 17, 2014 and published as US 2015/00404473 on Feb. 12 2015 (Inventor—Lankford et al.; Applicant—Earthtec Solutions) (14 pages).

Final Office Action dated Apr. 5, 2017 by the U.S. Patent and Trademark Office for U.S. Appl. No. 14/232,768, filed Sep. 17, 2014 and published as US 2015/00404473 on Feb. 12, 2015 (Inventor—Lankford et al.; Applicant—Earthtec Solutions) (14 pages).

USDA, National Engineering Handbook: Irrigation Guide, Chapter 3: Crops. Part 652: Irrigation Guide. 210-vi-NEH 652, IG Amend. NJI, Jun. 2005. United States Department of Agriculture, Natural Resources Conservation Service. 2005; <URL: https://www.nrcs.usda.gov/Internet/FSE_DOCUMENTS/nrcs141p2_017640.pdf> (8 pages).

Final Office Action dated Jun. 1, 2018 by the U.S. Patent and Trademark Office for U.S. Appl. No. 14/232,768, filed Sep. 17, 2014

(56) References Cited

OTHER PUBLICATIONS and published as US 2015/0040473 on Feb. 12, 2015 (Inventor—David Lankford; Applicant—Earthtec Solutions, LLC) (21 pages).

* cited by examiner

| analysis type | water management | water analysis | irrigation management | salt management | salt analysis | crop response |
|---|---|---|---|---|---|---|
| primary | TX₍ₘₘ₎ | | | TX₍ₛₘ₎ | | |
| secondary | TX₍ᵢᵥₘ₎ | TX₍ᵣₑₜₒ₎ | TX₍ₒₘ₎ | TX₍ᵢₐₘ₎ | TX₍ᵣₘ₎ | TX₍ₚₑₜᵥc₎ |
| | TX₍ₒₐₘₐ₎ | TX₍ₛ₎ | | | TX₍ₛₛ₎ | TX₍ₘₗᵤₑ₎ |
| | | TX₍ₗF₎ | | | | TX₍ₐᵥc₎ |
| | | | | | | TX₍ₛᵦ₎ |
| | | | | | | TX₍ᵨᵥₑ₎ |

FIG. 13

| Date | Time | 10 cm | 20cm | 30 cm | 40 cm | 50 cm |
|---|---|---|---|---|---|---|
| 6-Jul-10 | 3:45 PM | -0.03 | -0.01 | 0 | -0.02 | 0 |
| 7-Jul-10 | 4:00 PM | -0.04 | 0.01 | 0 | -0.01 | 0 |
| 8-Jul-10 | 4:15 PM | -0.06 | 0.02 | -0.01 | -0.02 | 0 |
| 9-Jul-10 | 4:30 PM | -0.03 | 0.01 | -0.02 | 0 | -0.01 |
| 10-Jul-10 | 4:45 PM | -0.01 | -0.02 | -0.01 | -0.02 | 0 |
| 11-Jul-10 | 5:00 PM | -0.02 | 0 | 0 | 0.01 | -0.01 |
| 12-Jul-10 | 5:15 PM | -0.03 | -0.01 | 0 | 0.01 | 0 |
| 13-Jul-10 | 5:30 PM | -0.02 | -0.01 | -0.01 | 0 | 0 |
| 14-Jul-10 | 5:45 PM | -0.03 | 0.01 | -0.01 | 0 | 0.01 |
| 15-Jul-10 | 6:00 PM | -0.04 | 0.01 | -0.02 | -0.01 | 0.01 |
| 16-Jul-10 | 6:15 PM | -0.03 | 0.02 | -0.01 | -0.01 | -0.01 |
| 17-Jul-10 | 6:30 PM | -0.01 | 0 | -0.05 | -0.01 | 0 |
| 18-Jul-10 | 6:45 PM | -0.02 | -0.01 | 0 | -0.02 | 0 |
| 19-Jul-10 | 7:00 PM | -0.03 | -0.01 | 0.01 | -0.01 | 0 |
| 20-Jul-10 | 7:15 PM | 0.13 | -0.02 | 0.03 | 0 | 0 |
| 21-Jul-10 | 7:30 PM | 0.75 | 0.05 | 0.01 | 0.01 | 0 |
| 22-Jul-10 | 7:45 PM | 1.31 | 0.13 | -0.03 | 0.02 | 0.01 |
| 23-Jul-10 | 8:00 PM | 1.65 | 0.22 | 0.03 | 0.01 | 0 |
| 24-Jul-10 | 8:15 PM | 0.4 | 0.49 | 0.06 | -0.01 | 0.01 |
| 25-Jul-10 | 8:30 PM | -0.73 | 0.36 | 0.09 | 0 | 0 |
| 26-Jul-10 | 8:45 PM | -0.52 | 0.22 | 0.1 | -0.01 | 0 |
| 27-Jul-10 | 9:00 PM | -0.27 | 0.09 | 0.11 | 0 | 0.01 |
| 28-Jul-10 | 9:15 PM | -0.06 | 0.06 | 0.62 | -0.02 | -0.01 |
| 29-Jul-10 | 9:30 PM | -0.01 | 0.02 | 0.47 | 0 | -0.01 |
| 30-Jul-10 | 9:45 PM | -0.02 | 0.01 | 0.09 | 0.01 | 0 |

FIG. 18

| Date | Time | 10cm | 20cm | 30cm | 40cm | 50cm |
|---|---|---|---|---|---|---|
| 3-Jul-08 | 7:45 AM | 17.18 | 22.03 | 19.95 | 20.3 | 29.12 |
| 3-Jul-08 | 8:00 AM | 17.08 | 22.03 | 19.95 | 20.3 | 29.12 |
| 3-Jul-08 | 8:15 AM | 18.98 | 22.02 | 19.95 | 20.3 | 29.12 |
| 3-Jul-08 | 8:30 AM | 18.87 | 22.01 | 19.94 | 20.3 | 29.12 |
| 3-Jul-08 | 8:45 AM | 18.77 | 22.01 | 19.93 | 20.3 | 29.12 |
| 3-Jul-08 | 9:00 AM | 18.67 | 22 | 19.91 | 20.29 | 29.12 |
| 3-Jul-08 | 9:15 AM | 18.64 | 22 | 19.87 | 20.29 | 29.12 |
| 3-Jul-08 | 9:30 AM | 20.22 | 22.28 | 19.87 | 20.29 | 29.12 |
| 3-Jul-08 | 9:45 AM | 20.91 | 23.85 | 19.97 | 20.29 | 29.12 |
| 3-Jul-08 | 10:00 AM | 20.98 | 24.74 | 20.11 | 20.29 | 29.12 |
| 3-Jul-08 | 10:15 AM | 19.8 | 24.74 | 20.17 | 20.29 | 29.11 |
| 3-Jul-08 | 10:30 AM | 18.78 | 24.5 | 20.17 | 20.29 | 29.11 |
| 3-Jul-08 | 10:45 AM | 18.23 | 24.33 | 20.16 | 20.29 | 29.11 |
| 3-Jul-08 | 11:00 AM | 17.81 | 24.16 | 20.14 | 20.29 | 29.11 |
| 3-Jul-08 | 11:15 AM | 17.43 | 23.98 | 20.12 | 20.29 | 29.11 |

FIG. 20

| TX$_{IDD}$ Distribution | 10 cm | 20 cm | 30 cm | 40 cm | 50 cm | Ions below Root zone |
|---|---|---|---|---|---|---|
| Start | 1543 | 1528 | 1307 | 1488 | 1904 | 43% |
| Finish | 1388 | 1422 | 1428 | 1746 | 4175 | 58% |
| Drift | -11.0% | -7.0% | 8.0% | 15.0% | 54.0% | |

FIG. 22

| | | | |
|---|---|---|---|
| $TX_{RD}$ Report Days | 90 | Days | Pg |
| $TX_{GD}$ Grow Days | 105 | Days | Pg |
| $TX_{EToT}$ ETo Total | 15.3 | Inches | Pg |
| $TX_{EToA}$ ETo Average | 0.15 | Inches | Pg |
| $TX_{EToDM}$ ETo Daily Max | 0.24 | Inches | Pg |
| $TX_{HU50}$ Heat Units from 50 | 4368 | Degrees | Pg |
| $TX_{HUA}$ Heat Units Average | 40.9 | Degrees | Pg |
| $TX_{HUM}$ Heat Units Max | 54.4 | Degrees | Pg |
| $TX_{TR}$ Total Rainfall | 15 | Inches | Pg |
| $TX_{TI}$ Total Irrigation | 9.8 | Inches | Pg |
| $TX_{TW}$ Total Water on Crops | 24.8 | Inches | Pg |
| $TX_{TWAS}$ Total Water Absorbed in | 20 | Inches | Pg |
| $TX_{UW}$ Unaccounted Water | 4.8 | Inches | Pg |
| $TX_{OSRWA}$ Optimum Soil Ratio | 22 | % | Pg |
| $TX_{OA}$ Optimum Allowance | 25 | % | Pg |
| $TX_{TH}$ Total Harvest in 1,000 lb | | lb | Pg |
| $TX_{RMZ}$ Root Management Zone | 12 | Inches | Pg |
| $TX_{SD}$ Stress Days | 21 | Days | Pg |
| $TX_{LF}$ Leaching Factor | 1 | Inches | Pg |
| $TX_{PWE}$ Plant Water Efficiency | 53 | % | Pg |
| $TX_{PEToC}$ Plant ETo Correction | 12.12 | Inches | Pg |
| $TX_{DES}$ Drip Emitter Spacing | .75 | Index | Pg |
| $TX_{RSL}$ Restricting Soil Layer | 16 | Inches | Pg |

This table has many of the single computation including $TX_{PWE}$. This table is in the Quick findings.

FIG. 24

ENVIRONMENTAL MONITORING

CROSS-REFERENCE TO RELATED APPLICATIONS

This patent application is a continuation of U.S. application Ser. No. 13/443,814 filed on Apr. 10, 2012, which relates to and claims priority from U.S. Provisional Patent Application 61/473,781, filed on Apr. 10, 2011, U.S. application Ser. No. 13/443,814 is a continuation-in-part of PCT Application No. PCT/US2011/030739, filed Mar. 31, 2011, which relates to and claims priority to U.S. Provisional Application No. 61/319,490, filed Mar. 31, 2010. The entirety of these applications are incorporated herein by reference.

BACKGROUND

In the environmental modeling space, the present art methodology is designed simply to monitor one aspect of the environmental medium. Typically, the related art incorporates a singular moisture data logger, which is designed to collect moisture data at regular intervals (generally every several hours). The measurements are converted into soil moisture readings and stored in memory. Data loggers with a graphical display usually show several days or weeks of readings in a line graph, allowing visibility relevant to recent soil moisture trends at a glance on the screen (see, e.g., FIG. 1). However, in this format, the data has limited value.

On average, related art technologies also use data loggers that store the daily soil moisture information for the season at all depths within the soil profile. The data from a soil moisture monitor can be summarized and downloaded throughout the season and is graphed to show the variation in moisture content for the whole soil profile (see, e.g., FIG. 2). The graph shows the summed readings from all sensors and provides an over simplified depiction of the soil moisture trends, which results in incomplete and misleading conclusions.

Related technologies use single data plotting versus cross referencing the collected data. As in this illustration (see FIG. 3), key decision makers underestimate the amount of water in their fields and over irrigate accordingly. In such a situation, the crop does not have time to use the water available and much of the water and nutrients applied soaks through the wet profile and is lost to deep percolation. The consequences can be characterized by a significant depletion of water resources and a considerable waste of natural resources (e.g., nutrients). Although the data in FIG. 1 and FIG. 2 applies the laws of physics, it does not apply the laws of statistics. Since the current art data interpretation and presentation is one-dimensional, the ability to precisely measure and or accurately execute actions related to reducing natural resource usage is insufficient as well.

Building precise action plans from principally wide-ranging information, especially if they impact the environment or the financial prosperity of the business, is unrealistic and impractical. Because much of today's media analysis receives data from one data source it is broad and un-defined. The consequence is that hard to define actions are taking place. This results in baseless decisions incapable of positively impacting the environment and using natural resources wisely. Examples of media include, but are not limited to, water, soil, and air.

For many market sectors, there exists a need in the art for a data-rich interpretive system and methodology that is capable of providing sophisticated and accurate analyses. For strategic decision makers, the need is to quickly and easily verify current environmental forces, which lead immediately to the assembly of well-defined procedures capable of reducing waste or providing sustainable actions.

The Plant Water Stress Index study, recently researched by USDA/ARS scientists (see, e.g., FIG. 3), illustrates a relationship with yield over various climatic conditions. Critical soil properties and characteristics that govern yields under a given climatic situation can be identified and used in a model as surrogate indicators of yield. From the USDA/ARS research (see. e.g., FIG. 3) it can be determined there is a direct correlation between yield and number of stress days. Stress is defined as the condition where the plant roots can not optimally take up water. Consequently, strategic producers are seeking out this type of information as well as other real-time analysis as a means to manage actions/inputs and the corresponding re-actions more precisely.

Moreover, in the fresh produce arena, there is increasing focus on issues, including traceability (the ability to describe the chain of custody of fresh product from field to a retail or food service establishment) and food safety (detection, or absence, of human pathogens in or on fresh produce). In each case, the aim of these efforts is to offer a degree of protection of these products to the consumer, but little information is shared with the public until some breach of the chain, or the safety of the products, is discovered.

There are other programs in place that highlight either the growers of fresh produce or the chefs involved in its preparation and presentation, the so-called 'celebrity growers' or 'celebrity chefs', including websites and/or articles in magazines or newspapers. However, the focus of these types of articles is on the motivations and histories of the celebrities, rather than on the produce itself: no clear indications of the nutritional value of the fresh foods or the measureable environmental impacts under which these foods were produced are presented.

Consequently, what is needed is a direct and transparent view of the production of a commodity, the logistics of movement from place of production to location of consumption, and measurements of the impact of production and transport practices on the environment.

SUMMARY

The subject disclosure relates generally to the field of multi-dimensional environmental monitoring, systematic dissection of interpretive relationships and extensive computational analysis, which can be displayed in a visual real-time data-rich web-based configuration called Adviro-Guard™ interpretive analysis. By means of building data subsets and in harmonization with the laws of physics contained within a particular environmental medium, strict statistical analyses are applied to produce significant and pertinent information for key decision makers.

The subject disclosure also relates to comprehensive data interpretation for all types of environmental and agronomic related medium examination and profiling. More particularly, in an aspect, provided is a well defined software methodology for examining and studying the interrelationship between subsets of data within the universe of collected data. Real-time charts, graphs and applicable data can be accessible through a web-based data-rich illustrative platform called AdviroGuard™ interpretive analysis. Adviro-Guard™ can comprise core computational formulas and software code, also referred to as $TX_{MA}$™ (Interpretive Media Analysis).

In what appears to be a universe of random numbers, AdviroGuard™ produces a deductive analysis. Because AdviroGuard™ can create data-subsets, which allows filtering of data to give meaningful information, portions of the $TX_{MA}$ can illustrate the interrelationship and correlation of the whole. AdviroGuard™'s data-rich interpretive computational software can make these determinations automatically. With an ever larger data-universe, more refined conclusions can be developed.

By fully understanding the precise source of the collected raw data, a cross reference and data-sorted structure can be achieved. Once the precise data source is identified, the underlying principle is to extract measured data points that are pertinent for specific analyses and management objectives. The core principle is to measure differences (referred to as "deltas") within each parameter. Such deltas can be part of a group of metrics based on differences and that serve to implement environmental monitoring as described herein. Such metrics can be computed and exploited by one or more of the various embodiments described herein. In order to recognize which force is acting upon the deltas, a range of differences can be calculated and grouped, and the "delta-intensity" can be placed into context by assigning them to a measurement of the state of the media at the time the delta occurs. Because the delta-intensity can be interpreted quantitatively, the outcome results in a computational result that is reproducible, thus generating the outcome has a measure of "predictability." As more data sites are collected, a computed form of "artificial intelligence" can be achieved by moving from assumptions to reproducible computations.

This "delta-intensity" methodology can utilize data collection sites as well as an explicitly defined media-characteristics model throughout the environmental profile. Through the construction of applicable algorithms, it is possible to anticipate the pattern of deltas and consequently adjust the applicable model automatically. This approach permits generation of graphs and analyses for the explicit media category and provide indicators for certain environmental forces. These computations are designed to provide the best achievable management assistance. Utilizing "deltas" and "delta intensities" allows utilization of moisture probe results without extensive calibration of the probe, since the results can be produced through "differences," rather than through absolute values of moisture readings alone.

As additional data are collected and stored in a wide-ranging cross-referencing database, a computational form of artificial intelligence can be created. Artificial intelligence thresholds can be refined in real-time or nearly real-time and become more accurate than graphing alone. This principle can be applied to many other areas such as the prediction of harvest dates based on planting dates, the zone of root activity of a particular variety and soil type, drought tolerance, fertilizer application efficiency, water usage efficiency, prediction of water needed, nutrient management timing, leak detection monitoring, and the like.

It is readily apparent that specialists in several professions can benefit from an advanced, efficient, quick, cost-effective, and well-developed information translation service enabling them to effectively manage their respective environmental impacts and sustainability protocols.

The subject disclosure also relates to the identification and magnification of the outcomes of the production and distribution process using Adviroguard™. More particularly, the subject disclosure relates to the use of environmental data, collected by Adviroguard™ software, as well as data supplied by the grower and members of the supply chain, to provide real-time analysis of measurements of crop water use efficiencies, crop nutrient use efficiencies, crop safety, carbon footprints (total carbon used), and other production ratios that define the impact of crop management practices on the environment. In an aspect, this data is available to consumers who can track these data for each crop either at the point of sale or through the web. Thereby offering to consumers, and the entire food supply chain, verifiable information derived from measurements, that describes factors influencing food nutritional value, environmental footprint, and food safety with definitions that deliver context to the interpretations of this data in easy-to-understand, consumer-friendly language. In an aspect, the data can be provided to consumers under the name or symbol identifier "Nature's Eye."

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 13 presents an overview of where primary data transformations exist and available secondary calculations in accordance with aspects of the subject disclosure;

FIG. 18 presents a table comprising positive deltas of percent volumetric soil water moisture readings at various depths over a data collection period;

FIG. 20 presents a table with a set of exemplary readings that illustrate stress in accordance with aspects of the subject disclosure;

FIG. 22 illustrates the Ion Distribution and Drift calculation made on ions observed in a soil profile in accordance with aspects of the subject disclosure;

FIG. 24 illustrates Water Efficiency in accordance with aspects of the subject disclosure;

DETAILED DESCRIPTION

Figure 1:
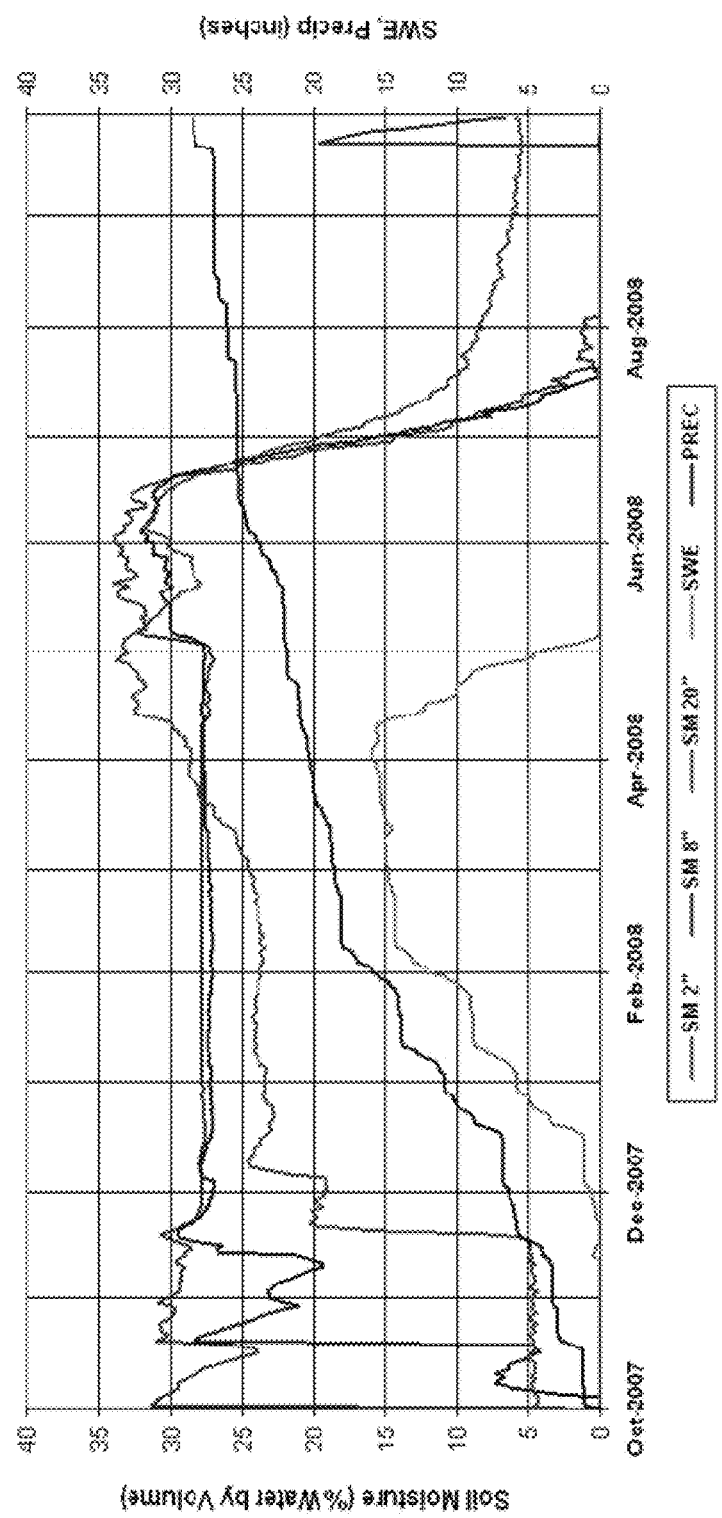
FIG. 1 is a traditional data logger with graphical display.

Before embodiments of the subject disclosure are described, it is to be understood that the methods and systems are not limited to specific methods, specific components, or to particular compositions. It is also to be understood that the terminology used herein is for the purpose of describing particular, yet not exclusive, embodiments only and is not intended to be limiting.

As used in the specification, annexed drawings, and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of the subject disclosure including, but not limited to, steps in disclosed methods. Thus, if there are a variety of additional steps that can be performed, it is understood that each of these additional steps can be performed with any specific embodiment or combination of embodiments of the disclosed methods.

The present methods and systems may be understood more readily by reference to the following detailed description of illustrative embodiments and the Examples included therein and to the Figures and their previous and following description.

Methods and systems disclosed herein may take the form of an entirely hardware embodiment, an entirely software embodiment, or an embodiment combining software and hardware aspects. Furthermore, such methods and systems may take the form of a computer program product on a computer-readable storage medium having computer-readable computer-executable instructions (e.g., computer software) embodied in the storage medium. More particularly, the subject methods and systems may take the form of web-implemented computer software. Any suitable computer-readable storage medium may be utilized including hard disks, CD-ROMs, optical storage devices, or magnetic storage devices.

Embodiments of the subject disclosure are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer-executable instructions. These computer-executable instructions may be loaded onto a general purpose computer, a special purpose computer, or other programmable computing device or data processing apparatus to produce a machine, such that the computer-executable instructions which execute on the computer or the other programmable computing device or data processing apparatus create a means for implementing the functions specified in the flowchart block or blocks.

These computer-executable instructions may also be stored in a computer-readable memory that can direct a computer or other programmable computing device or data processing apparatus to function in a particular manner, such that the instructions stored in the computer-readable memory produce an article of manufacture including computer-readable computer-executable instructions for implementing the function specified in the flowchart block or blocks. The computer program instructions may also be loaded onto a computer or other programmable computing device or data processing apparatus to cause a series of operational steps to be performed on the computer or the other programmable computing device or apparatus to produce a computer-implemented process such that the computer-executable instructions that execute on the computer or the other computing device or programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block (e.g., unit, interface, processor, or the like) of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, provided is an interface application, referred to as the Earthtec Solutions Universal Data Interface (UDI). The UDI can be web-based or installed locally on a user computer. Traditional web-interface applications interface with a single data source in one computer language. The UDI is a unique platform capable of interpreting multiple sources of raw data in diverse computer language platforms and converting the raw data into a single language designed for interpretive purposes. Coupled with the human interface component, the UDI becomes a principle analytical apparatus for assembling the components for the TX™ data processing and displays.

The following terminology generally applies to the various embodiments of the subject disclosure;

Aerobic Soils.—Air penetrates between soil particles to a certain depth. Soil type and density affect the oxygen depth. If oxygen is in the soil, such soil is considered aerobic soil. Aerobic soil contains micro-organisms that give the soil plant growing capabilities.

Anaerobic soil.—Soil that lies beneath the aerobic soil. There is low activity in this zone.

Depletion Line.—Depletion Line (DL) is a reference point between field capacity (FC) and permanent wilt (e.g., FC=10%, PW=2%, depletion at 50%, DL=6%).

Drainage.—When over watered the water movement down is considered draining. Movement below the root zone is considered leaching.

ETo.—Model that utilizes air temperature, wind speed, light intensity, relative humidity to compute what an acre of grass 1 inch high would lose in water on a per acre basis.

Evaporation-Transpiration (ET).—Soil moisture can move in the soil in three ways. When water moves upwards and out of the soil, it is considered to be ET. Transpiration is water moved from the soil by a plant. Evaporation is the moisture lost off the surface of the soil.

ET Coefficient (Etc).—Etc is a diagnostic measurement that can reflect how well the plant is extracting water based on ETo. Based on ETo, the Etc is an indicator of over or under watering.

Grow Days.—The number of days from planting to end of harvest. If multiple harvest, then end of harvest refers to the end of the last harvest.

Nutrient Efficiency.—A measurement of the nutrient management reflecting maximum output for minimum input. Generally conveyed in "units per pound."

Optimum Allowance.—By monitoring root activity, a profile of water uptake can be determined. As the soil moisture decreases, the plants ability to extract moisture is reduced. By measuring the uptake, it is possible to determine when the plant is in stress taking up water. Optimum allowance allows computation of how wide a swing in soil moisture is possible before a plant starts to struggle for water.

Optimum Soil Ratio Water/Air.—By monitoring root activity and adding water uptake every 15 minutes, it can be determined when the optimum soil ratio between water and air is achieved. This becomes the baseline to manage irrigation. Generally, optimum soil ratio water/air coupled with optimum allowance forms a window of management.

Soil Texture.—Soil texture largely determines field capacity and permanent wilt (e.g., instance whereby a plant can no longer extract water from the soil to maintain life). Soil texture is measured in the percent of three particle sizes. Sand has the largest particle size, silt has the second largest size, and clay has the smallest particle size.

Root Activity.—Feeder roots are designed to take up water and nutrients. Feeder roots must move forward or they perish. Feeder roots only develop and move through moist soil. Feeder roots are the most effective in aerobic soils. Nearly 80% activity of all feeder root activity is within the top 8 inches of soil. Root development generally is random. Roots cannot find water and grow to the water. Once water is detected, a plant develops more feeder roots in the area in which water was detected. Root activity mostly occurs during daylight.

Stress Days.—A stress day is a day in which the water uptake does not closely reflect ETo. If a plant is not in the window of optimum root activity, this is considered stress.

Symbol—A symbol is any mark that can be associated with a unique identifier described herein. For example, a symbol can be, but is not limited to a bar code, an RFID tag, a QR code, a number, or any other marking known in the art. In an aspect, the symbols described herein can be affixed to a product and can be scanned or entered by a user as part of a request for a crop management or crop transport profile.

Total irrigation.—Amount of water applied to the crop. Measured in inches it is based on an acre. In an aspect, there are 27.154 gallons of water in an acre inch.

Water/Soil Ratios.—In order to manage plants at a high level, understanding of where the plant is extracting water within the soil profile is essential. The subject disclosure establishes ratios conveying the total availability of water in 4" increments to illustrate the amount of water extracted and showing the correlation between available water and uptake from the plant. This is one of the essential components necessary to managing water and nutrient uptake. This is referred to as the management zone.

Water Efficiency.—Most any plant transpires water in order to move nutrients and chemicals throughout the plant. The amount of water retained for plant and fruit production can be measured as water efficiency. The higher the percent, the better the water efficiency. Water efficiency is thus a measure of optimum water use.

Figure 4:
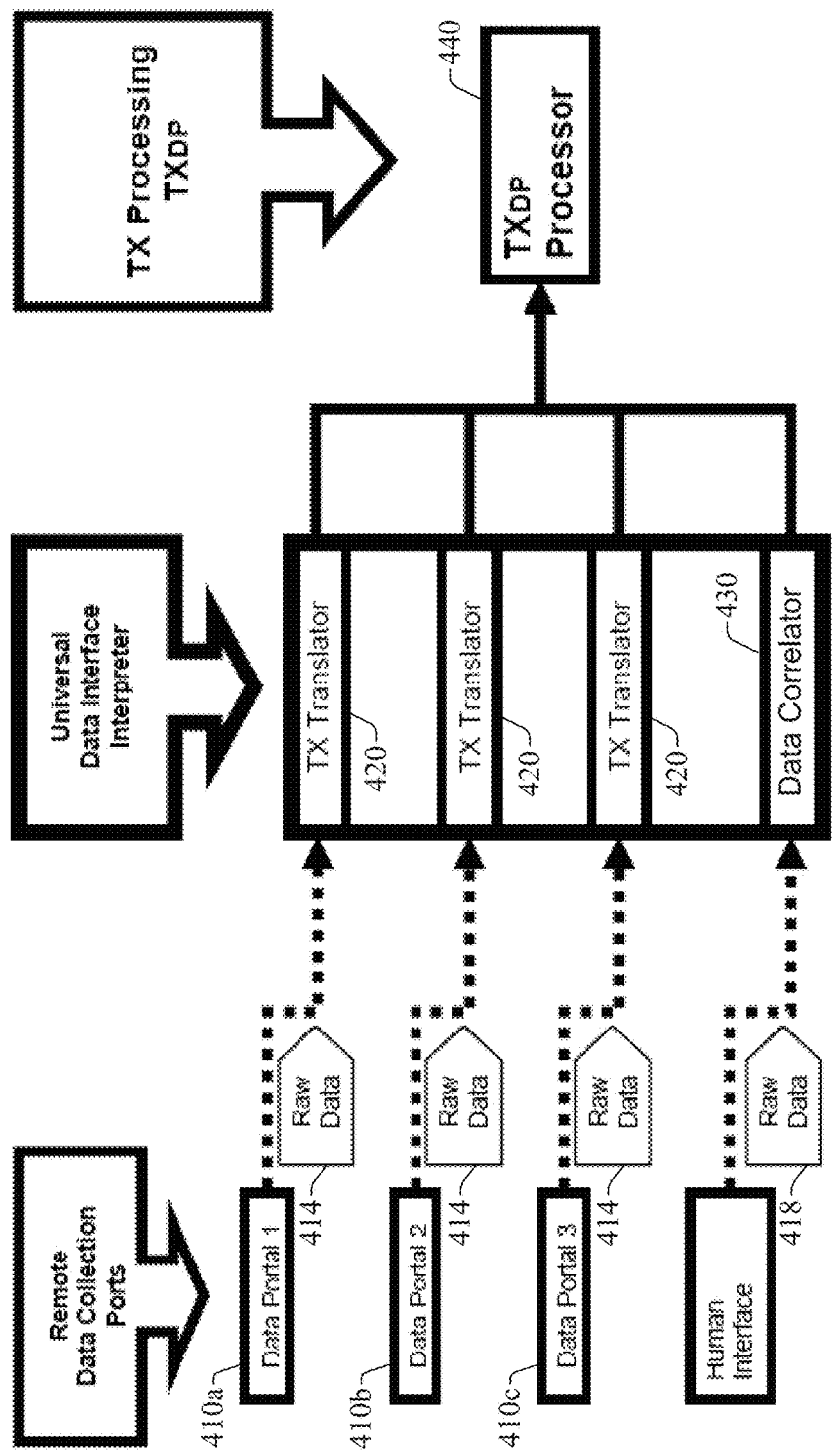
FIG. 4 is a Web Interface/Universal Data Interface (referred to as $TX_{UDI}$) in accordance with aspects of the subject disclosure.

In an aspect, provided are methods for enabling interaction between a user and the system. As shown in FIG. 4, the UDI can request and receive data (raw data or pre-processed data) from remote data collection sites; see Remote Data Collection Ports in FIG. 4, illustrated with three sensors or data portals 410a, 410b, and 410c. Such data collection sites (e.g., data portals) can comprise systems operating under multiple computer language platforms. The UDI can convert the received data (e.g., raw data 415) into a single language platform. For example, TX Translator units 420 (also referred to as TX Translators 420) can convert the received data in UDI. It should be appreciated that while three TX Translators 420 are illustrated in FIG. 4, corresponding to the three raw data streams, more or less TX translators can be included in the UDI. The data can then be correlated with human interface raw data (e.g., raw data 418). Data correlator unit 430 (also referred to as Data Correlator 430) can correlate data with the human interface raw data. For example, raw data of the type received from $TX_{CDM+}$ (Client Data Module). For example, a local phone book would represent a generic data collect site. The information assembled in such a phone book would include phone numbers, names, and addresses, all of which could be described as a generic database. Human entered data can include the original phone book in question, plus information from other phone books for the area. Data Correlator 430 is designed to include all the different "phone books" plus enhancements, which might include age, number of children, race, political preference, etc. When monitoring soil moisture, the software provides the relationship between soil moisture and saline data points. By providing the human interface, users can add yield, nutrients applied and spray applications, which cannot be measured electronically. After correlations are drawn regarding how the inputs influence the outputs, resources can be managed which cannot be monitored directly.

The UDI can provide the reformulated data (e.g., data cast into the single language platform) to a TX Data Processor 440 (see TX Processing in FIG. 4). The TX Data Processor 440 can filter and qualify data and then perform computations to produce numbers and displays (e.g., graphs, charts, or the like), which are crucial to helping managers make timely decisions and to formulate long-term analyses and action plans.

Figure 5:
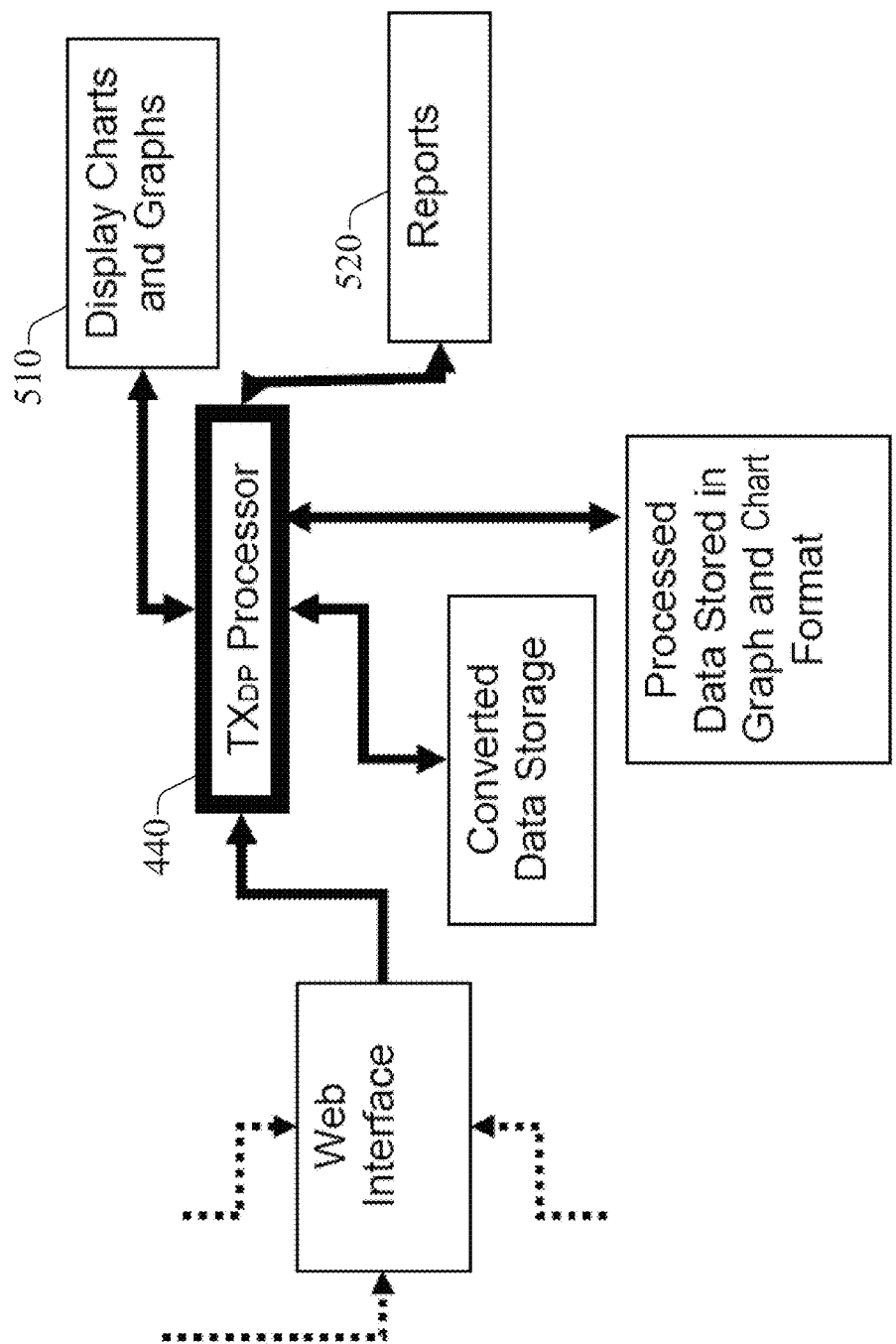
FIG. 5 is a Data Processing and Display $TX_{UDI}$ in accordance with aspects of the subject disclosure.

In an aspect, provided are methods (collectively referred to as the TX series or TX methodology) for producing a series of displays 510 (charts, graphs, etc.) and numbers used to make immediate decisions, implement instantaneous actions and long term actions. Such numbers and other related information can be cast into various reports 520. The first step in this process is to collect data from remote data collection sites. This can be performed utilizing the UDI, as described hereinbefore. After the data is translated into TX terminology, the data can be processed and the resulting displays (charts, graphs, etc.) and numbers can be stored for current or future use. FIG. 5 illustrates features of data processing implemented by the various methods and systems disclosed herein. In an example scenario, streams of raw data (dashed lines in FIG. 5) are received by a web interface, such as UDI or a part thereof, which reformulates the raw data and supplies it to $TX_{DP}$ Processor 440. The $TX_{DP}$ processor 440 generates data and reports, and supplies at least a portion of the data to various memories (e.g., data storage). TXDP processor 440 can supply data processed in accordance with various levels of complexity; for instance, processed data can be retained in memory (e.g., data storage) in graph or chart format.

The primary TX relationship can be generated through the $TX_{MA}$ (Media Analysis). The $TX_{MA}$ Can set optimum points by which many TX charts (e.g., secondary charts) and graphs are created to compile meaningful analysis and management guidelines. The UDI can bring in raw data and convert the data into meaningful numbers. For example, the $TX_{MA}$ can generate a report designed to compile meaningful management guidelines or analysis. By drawing correlations between deltas, polarities and delta intensities, the UDI can bring in raw data and convert the data into meaningful numbers.

In an aspect, $TX_{MA}$ Can convert data in a first format (e.g., format of an old computer language) to a second format (e.g., format of a new computer language). For example, a raw data sensor reading may be 136. This is converted to read 55 degrees Fahrenheit. That data can be then stored in a first data storage site. As illustrated in Table 1, certain stored data also can have a time stamp and a reference to each sensor, such as a tag number or a record number. Table 1 is a short example of converted and stored raw data.

TABLE 1

| Date | Time | 10 cm | 20 cm | 30 cm | 40 cm | 50 cm |
|---|---|---|---|---|---|---|
| 29 Apr. 2008 | 9:45 AM | 12.86 | 22.06 | 20.25 | 27.27 | 35.51 |
| 29 Apr. 2008 | 10:00 AM | 12.79 | 22.04 | 20.25 | 27.25 | 35.51 |
| 29 Apr. 2008 | 10:15 AM | 12.75 | 22.03 | 20.25 | 27.24 | 35.51 |
| 29 Apr. 2008 | 10:30 AM | 12.69 | 22.03 | 20.24 | 27.22 | 35.51 |
| 29 Apr. 2008 | 10:45 AM | 12.64 | 22.01 | 20.24 | 27.21 | 35.5 |
| 29 Apr. 2008 | 11:00 AM | 12.58 | 22.01 | 20.23 | 27.2 | 35.5 |
| 29 Apr. 2008 | 11:15 AM | 12.53 | 22 | 20.23 | 27.18 | 35.5 |
| 29 Apr. 2008 | 11:30 AM | 12.49 | 21.98 | 20.23 | 27.17 | 35.5 |
| 29 Apr. 2008 | 11:45 AM | 12.44 | 21.97 | 20.23 | 27.16 | 35.5 |
| 29 Apr. 2008 | 12:00 PM | 12.38 | 21.95 | 20.22 | 27.15 | 35.5 |
| 29 Apr. 2008 | 12:15 PM | 12.34 | 21.91 | 20.22 | 27.14 | 35.5 |
| 29 Apr. 2008 | 12:30 PM | 12.3 | 21.9 | 20.22 | 27.14 | 35.5 |
| 29 Apr. 2008 | 12:45 PM | 12.24 | 21.88 | 20.22 | 27.13 | 35.5 |
| 29 Apr. 2008 | 1:00 PM | 12.2 | 21.86 | 20.22 | 27.12 | 35.49 |
| 29 Apr. 2008 | 1:15 PM | 12.15 | 21.83 | 20.22 | 27.11 | 35.49 |
| 29 Apr. 2008 | 1:30 PM | 12.1 | 21.81 | 20.21 | 27.11 | 35.49 |
| 29 Apr. 2008 | 1:45 PM | 12.06 | 21.78 | 20.21 | 27.1 | 35.49 |
| 29 Apr. 2008 | 2:00 PM | 12.02 | 21.74 | 20.21 | 27.1 | 35.49 |
| 29 Apr. 2008 | 2:15 PM | 11.98 | 21.71 | 20.21 | 27.08 | 35.48 |
| 29 Apr. 2008 | 2:30 PM | 11.94 | 21.69 | 20.21 | 27.08 | 35.48 |
| 29 Apr. 2008 | 2:45 PM | 11.9 | 21.64 | 20.2 | 27.07 | 35.48 |
| 29 Apr. 2008 | 3:00 PM | 11.86 | 21.62 | 20.2 | 27.07 | 35.48 |
| 29 Apr. 2008 | 3:15 PM | 11.84 | 21.59 | 20.2 | 27.06 | 35.48 |
| 29 Apr. 2008 | 3:30 PM | 11.81 | 21.57 | 20.2 | 27.06 | 35.47 |
| 29 Apr. 2008 | 3:45 PM | 11.77 | 21.55 | 20.2 | 27.05 | 35.47 |
| 29 Apr. 2008 | 4:00 PM | 13.12 | 21.59 | 20.19 | 27.04 | 35.47 |
| 29 Apr. 2008 | 4:15 PM | 15.23 | 21.91 | 20.19 | 27.04 | 35.48 |
| 29 Apr. 2008 | 4:30 PM | 15.87 | 22.21 | 20.23 | 27.04 | 35.48 |
| 29 Apr. 2008 | 4:45 PM | 16.17 | 22.48 | 20.3 | 27.06 | 35.48 |
| 29 Apr. 2008 | 5:00 PM | 16.37 | 22.84 | 20.8 | 27.1 | 35.48 |

Table 1 shows the relative day and time stamp for five different soil moisture sensor readings at the depths indicated in the headings of Table 1, which is separated into five columns displaying values for each increment of data collected regarding volumetric soil moisture measurement. To determine a delta, the $TX_{MA}$, for example, takes the data from Table 1, whereby, data in line 1 is subtracted from Line 2, Line 2 is subtracted from Line 3, etc., from which creates the respective deltas that are represented within Table 2.

TABLE 2

| Date | Time | 10 cm | 20 cm | 30 cm | 40 cm | 50 cm |
|---|---|---|---|---|---|---|
| 29 Apr. 2008 | 9:45 AM | −0.07 | −0.02 | 0 | −0.02 | 0 |
| 29 Apr. 2008 | 10:00 AM | −0.04 | −0.01 | 0 | −0.01 | 0 |
| 29 Apr. 2008 | 10:15 AM | −0.06 | 0 | −0.01 | −0.02 | 0 |
| 29 Apr. 2008 | 10:30 AM | −0.05 | −0.02 | 0 | −0.01 | −0.01 |
| 29 Apr. 2008 | 10:45 AM | −0.06 | 0 | −0.01 | −0.01 | 0 |
| 29 Apr. 2008 | 11:00 AM | −0.05 | −0.01 | 0 | −0.02 | 0 |
| 29 Apr. 2008 | 11:15 AM | −0.04 | −0.02 | 0 | −0.01 | 0 |

TABLE 2-continued

| Date | Time | 10 cm | 20 cm | 30 cm | 40 cm | 50 cm |
|---|---|---|---|---|---|---|
| 29 Apr. 2008 | 11:30 AM | −0.05 | −0.01 | 0 | −0.01 | 0 |
| 29 Apr. 2008 | 11:45 AM | −0.06 | −0.02 | −0.01 | −0.01 | 0 |
| 29 Apr. 2008 | 12:00 PM | −0.04 | −0.04 | 0 | −0.01 | 0 |
| 29 Apr. 2008 | 12:15 PM | −0.04 | −0.01 | 0 | 0 | 0 |
| 29 Apr. 2008 | 12:30 PM | −0.06 | −0.02 | 0 | −0.01 | 0 |
| 29 Apr. 2008 | 12:45 PM | −0.04 | −0.02 | 0 | −0.01 | −0.01 |
| 29 Apr. 2008 | 1:00 PM | −0.05 | −0.03 | 0 | −0.01 | 0 |
| 29 Apr. 2008 | 1:15 PM | −0.05 | −0.02 | −0.01 | 0 | 0 |
| 29 Apr. 2008 | 1:30 PM | −0.04 | −0.03 | 0 | −0.01 | 0 |
| 29 Apr. 2008 | 1:45 PM | −0.04 | −0.04 | 0 | 0 | 0 |
| 29 Apr. 2008 | 2:00 PM | −0.04 | −0.03 | 0 | −0.02 | −0.01 |
| 29 Apr. 2008 | 2:15 PM | −0.04 | −0.02 | 0 | 0 | 0 |
| 29 Apr. 2008 | 2:30 PM | −0.04 | −0.05 | −0.01 | −0.01 | 0 |
| 29 Apr. 2008 | 2:45 PM | −0.04 | −0.02 | 0 | 0 | 0 |
| 29 Apr. 2008 | 3:00 PM | −0.02 | −0.03 | 0 | −0.01 | 0 |
| 29 Apr. 2008 | 3:15 PM | −0.03 | −0.02 | 0 | 0 | −0.01 |
| 29 Apr. 2008 | 3:30 PM | −0.04 | −0.02 | 0 | −0.01 | 0 |
| 29 Apr. 2008 | 3:45 PM | 1.35 | 0.04 | −0.01 | −0.01 | 0 |
| 29 Apr. 2008 | 4:00 PM | 2.11 | 0.32 | 0 | 0 | 0.01 |
| 29 Apr. 2008 | 4:15 PM | 0.64 | 0.3 | 0.04 | 0 | 0 |
| 29 Apr. 2008 | 4:30 PM | 0.3 | 0.27 | 0.07 | 0.02 | 0 |
| 29 Apr. 2008 | 4:45 PM | 0.2 | 0.36 | 0.5 | 0.04 | 0 |
| 29 Apr. 2008 | 5:00 PM | −0.66 | 0.16 | 0.75 | 0.35 | 0 |

Figure 6A:
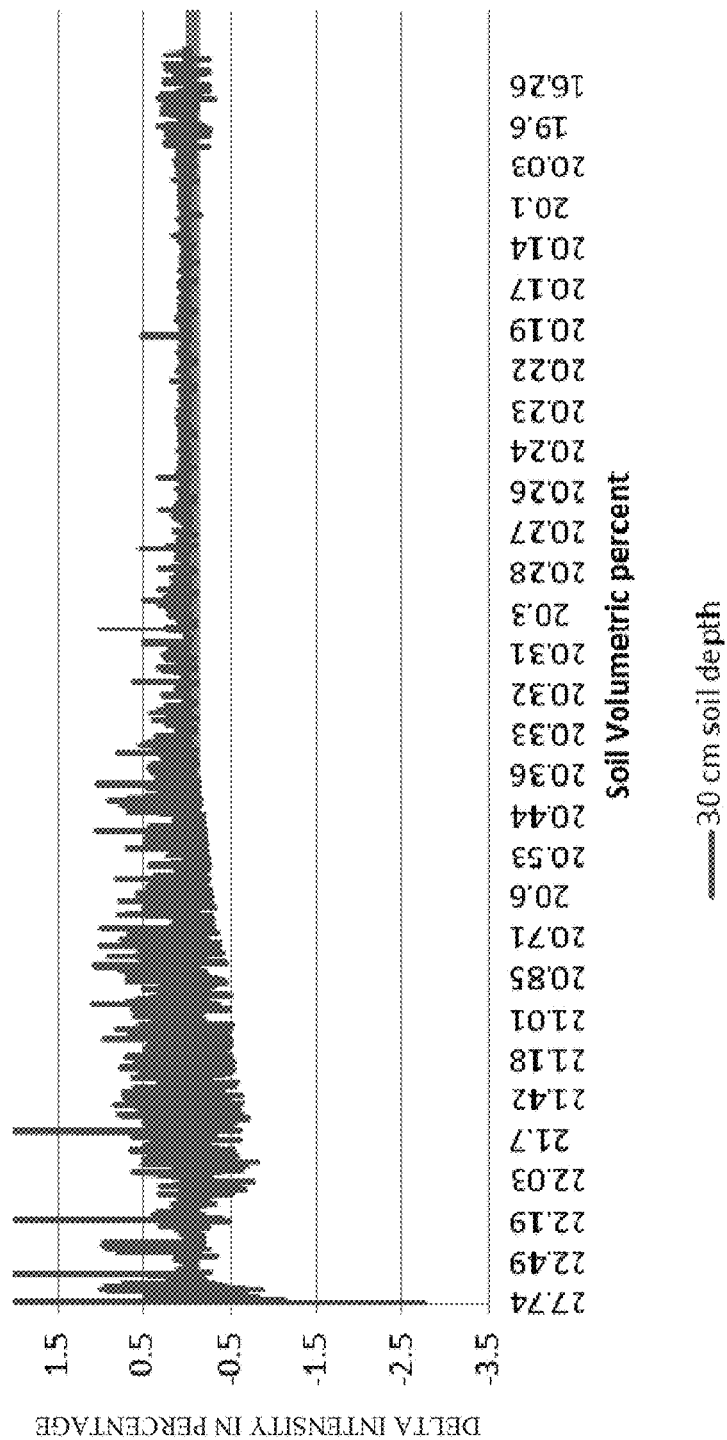
FIG. 6A presents delta values as a function of soil volumetric percent.
Figure 6B:
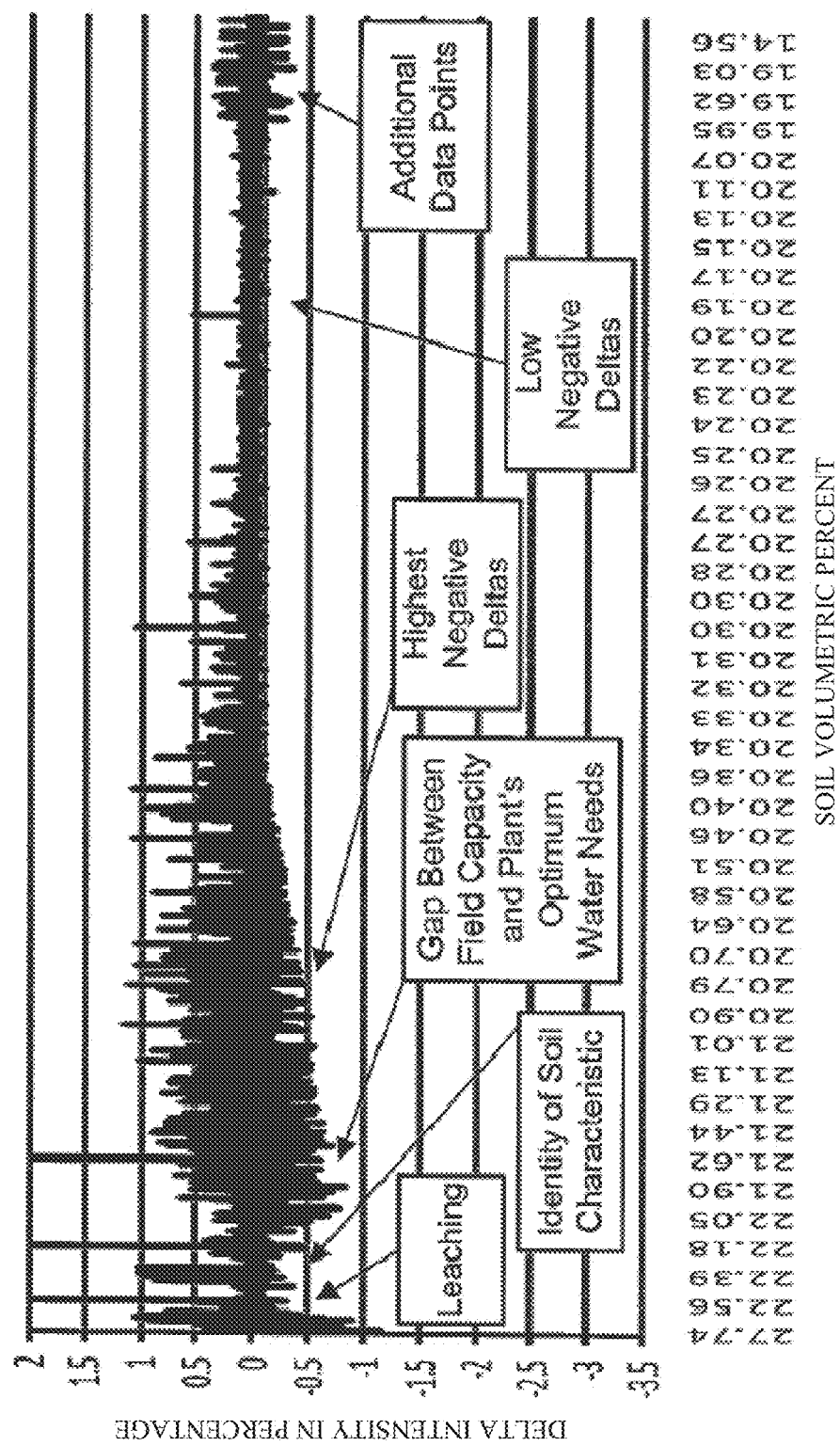
FIG. 6B presents delta values as a function of soil volumetric percent.

The sign of a value of a delta (also referred to as the polarity of the delta) indicates if the change (delta) is accumulating (positive numbers) or depleting (negative numbers) from the previous reading or time stamp. The magnitude of the delta is important to help determine the forces being applied that caused the specific delta-intensity. For example, if the delta intensity is greater than 0.05%, then it is known empirically that the force being applied is rainfall, irrigation, or other significant external force. Such conclusion also is valid for negative deltas. Available deltas can be processed in several ways. Each progression provides insight into different aspects of the soil, water or plant characteristics. As shown in FIG. 6A and FIG. 6B, with the deltas created the data can be sorted by the original percent volumetric soil moisture value reading on the X axis and the delta on the Y axis.

Figure 2:
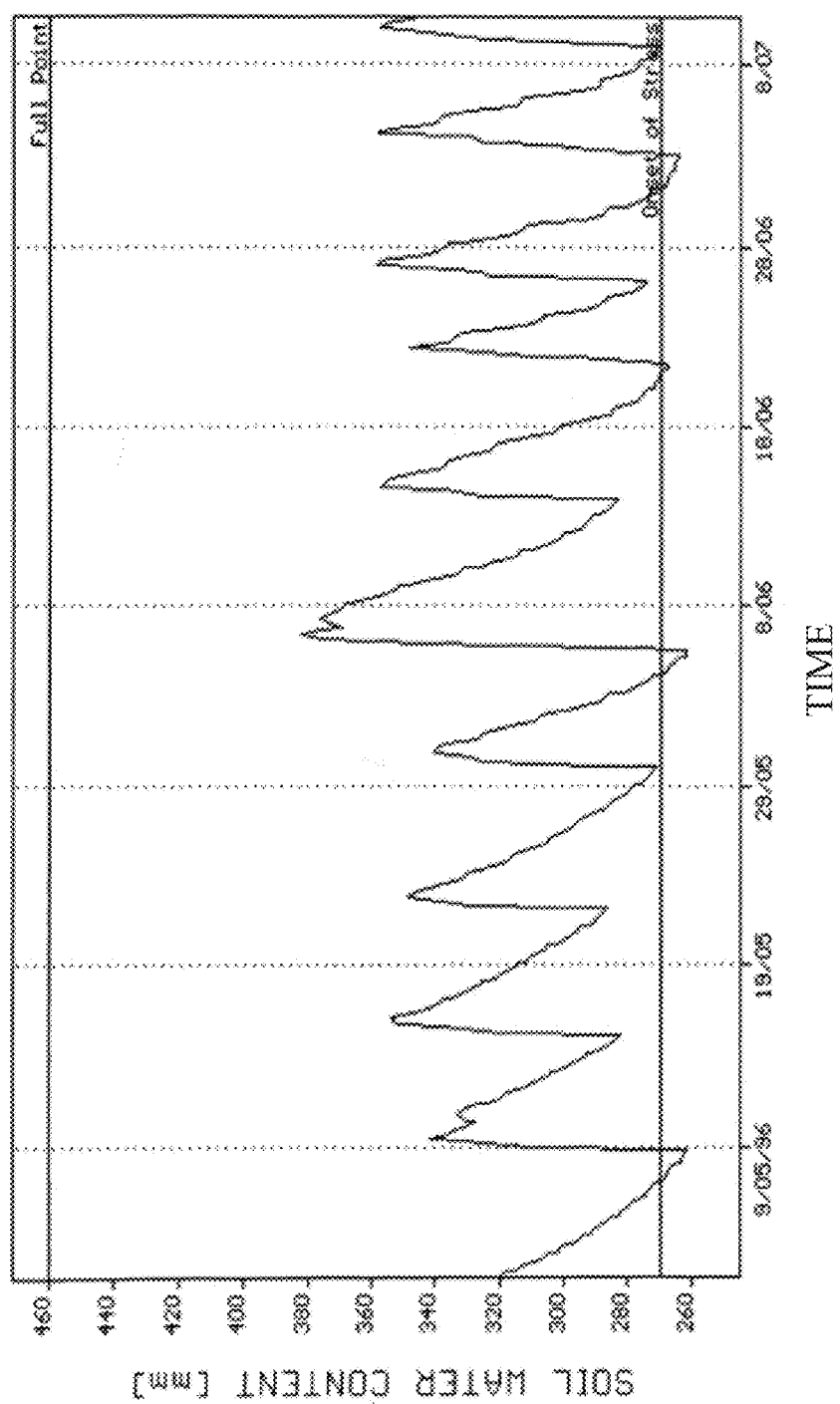
FIG. 2 is a traditional graph showing summed readings.
Figure 3:
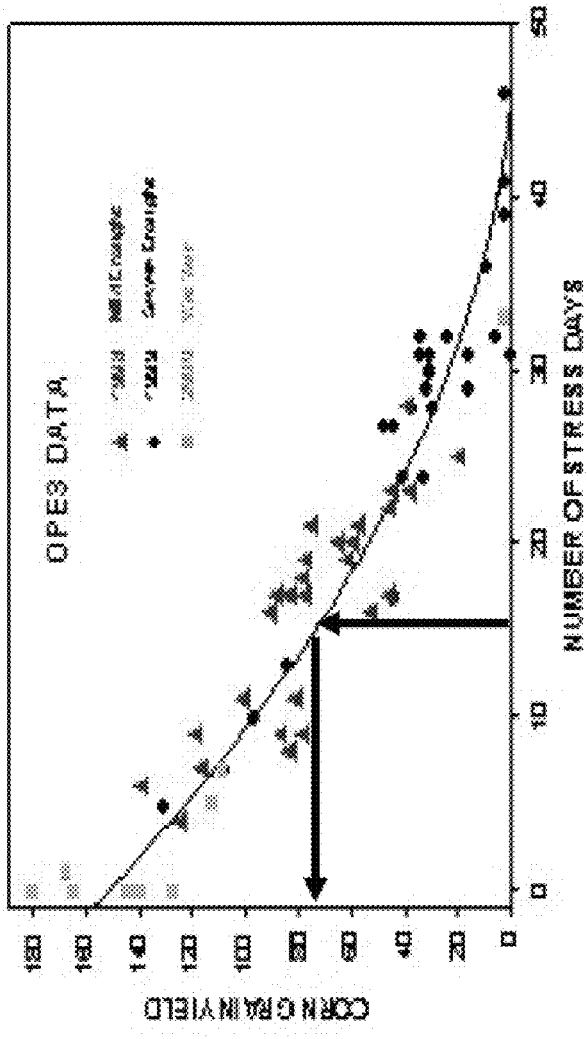
FIG. 3 is a Plant Water Index Study from USDA.
Figure 7:
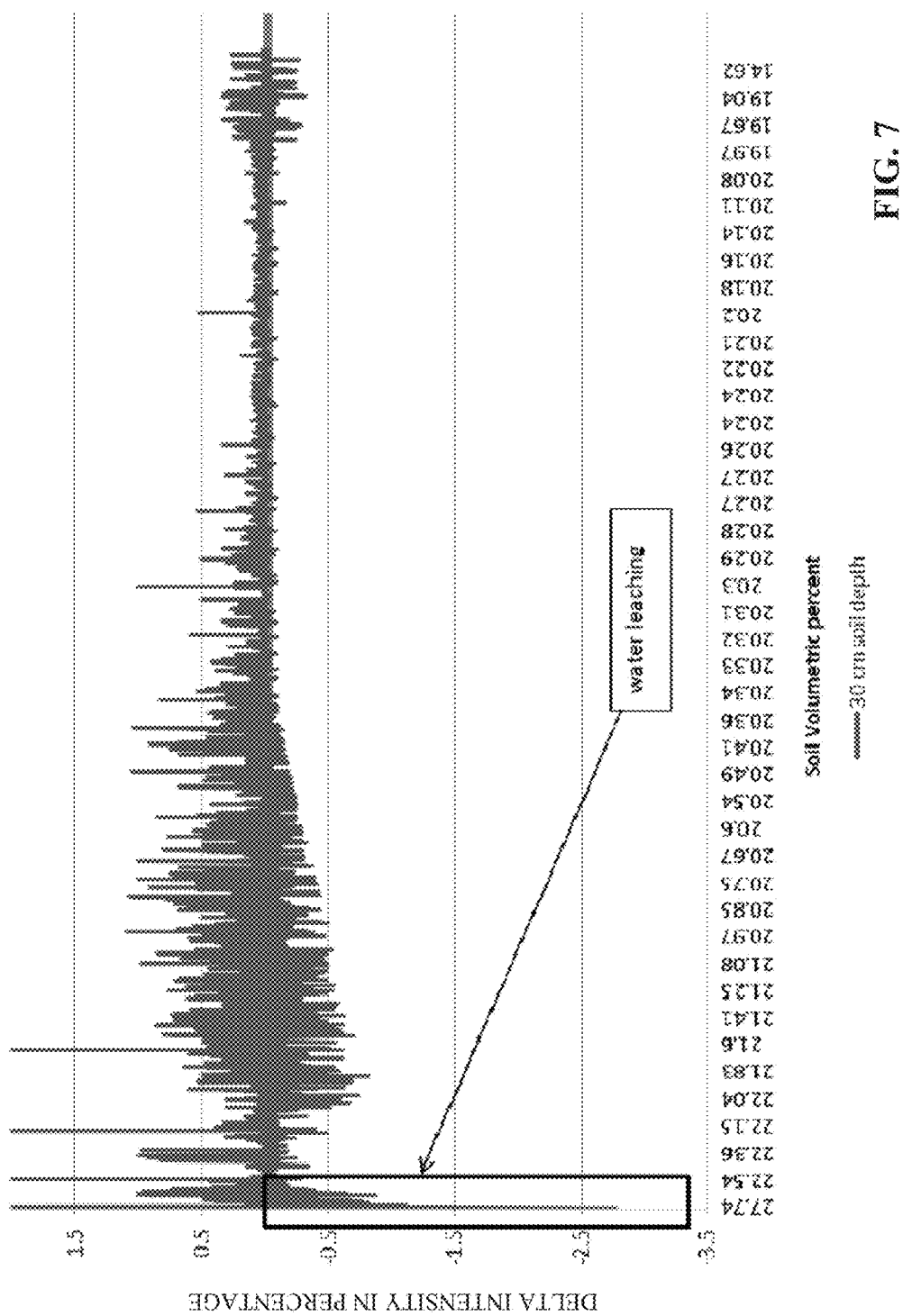
FIG. 7 is a Chart representing Leaching.

Relevancy of data present in FIG. 6A and FIG. 6B becomes apparent after portions of the data are categorized into meaningful and extremely valuable information. Depending on a particular soil type (e.g., percentages of sand, silt, and clay in the soil), the soil can hold water until the tension on the soil particles on water is exceeded, after which the water will move under the influence of gravity down into the next layer. In FIG. 7, the apparent field capacity of the soil has been exceeded when the negative deltas are the greatest. The progression of negative deltas proceeds from values with greater magnitudes to values with smaller magnitudes as the percentage volumetric soil moisture content decreases, indicating that water, which is moving under the influence of gravity, drains from the soil in decreasing percentages. While in certain cases the field capacity of the soil can be estimated from the graph of percent volumetric water content (Y axis) versus time (X axis) (see, e.g., FIG. 2), it is believed, without wishing to be bound by theory or modeling, that a more accurate estimate of field capacity can be derived by plotting the negative deltas versus percent volumetric water content where the result is a straight line—generally, with a correlation coefficient equal to, or greater than 0.90, or which also can be defined at correlation coefficients less than that value in specific soil types, or other factors, according to accumulated experience—with the ordinate intercept of such straight line (y=mx+b) being equal to the field capacity. Such representation is a novel computational method to determine field capacity immediately after an irrigation or rainfall event, and such determination can be made repeatedly throughout the data collection period after every irrigation or rainfall event and stored in a database to determine if there is any drift in the value over the duration of the period. A change in the apparent field capacity of the soil can be due to some physical change in the properties of the soil to alter its water holding capacity immediately adjacent to the soil moisture probe; for instance, the growth of roots close to the access tube of the probe. It is also important to provide an accurate estimate of field capacity, since the numerical value for field capacity represents the upper bound for $TX_{OSRWA}$, the percent volumetric soil moisture where air and water exist at an optimum ratio in the soil, allowing enough air to provide oxygen for root metabolism and enough water to allow for expansion growth in roots, stems and leaves. It should be appreciated that to have enough air in the soil to support active root metabolism, the % volumetric water content cannot exceed the field capacity of the soil.

Leaching is defined in the $TX_{MA}$ as any water that leaves the soil profile when the soil water content is above field capacity. The greatest negative deltas (e.g., those less than −0.1) are usually associated with leaching. Leaching is important since it enables movement of nutrients and other soluble substances from the soil surface to other horizons within the soil profile. It should be appreciated that such movement can have both positive and negative implications, depending on the substances involved and the depths to which such substances travel.

Figure 8:
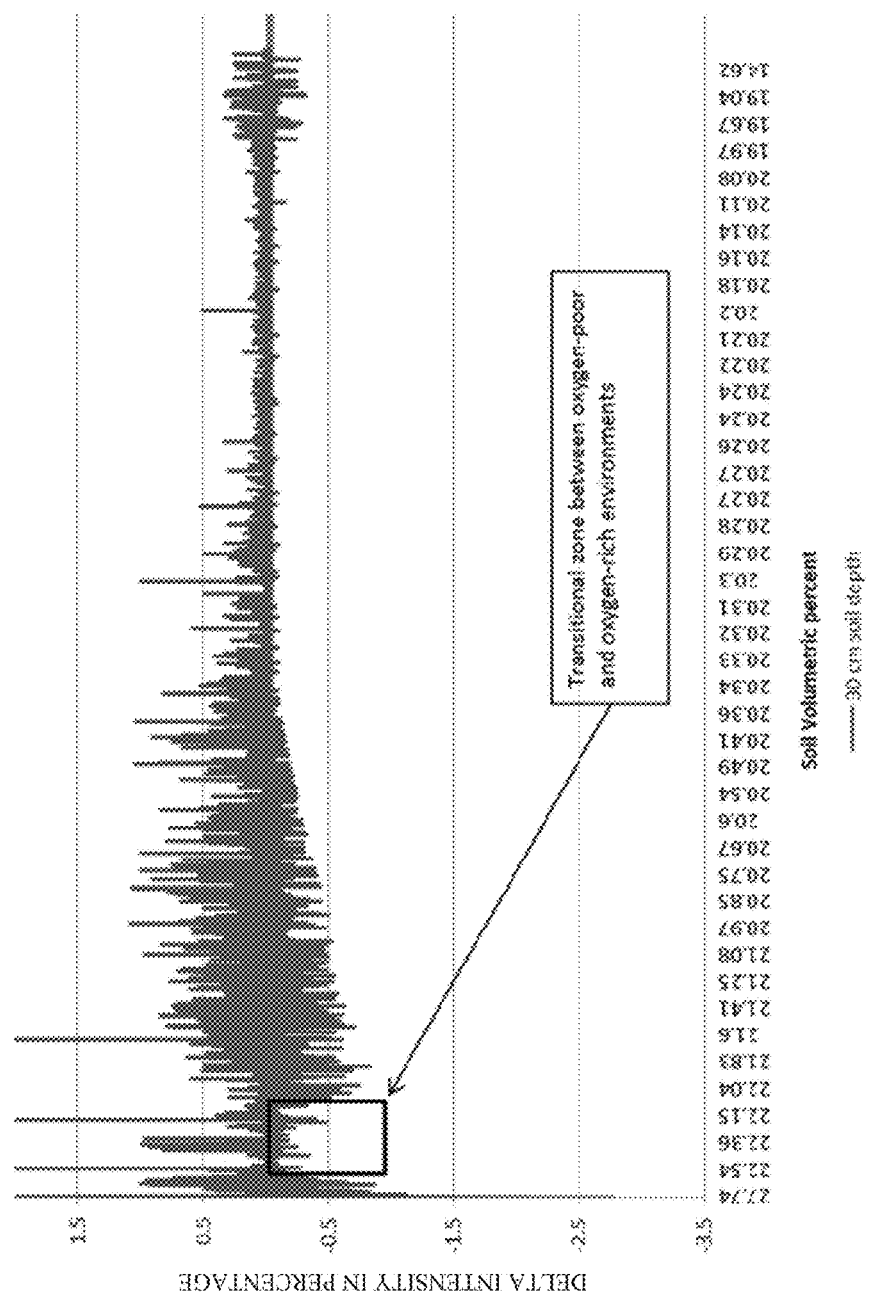
FIG. 8 is a Chart representing the Identity of the Soil Characteristics.

The section identified in FIG. 8 indicates a characteristic of soil moisture behavior previously unknown. For a small window the plants do not appear to take up water near the field capacity point of the soil since negative deltas are conspicuously absent in this region of the graph. This phenomenon has been revealed on most of the charts graphed below the 10 cm soil profile, particularly, yet not exclusively, in irrigation scenarios where probes have been installed on plastic mulch; it should be appreciated that data from the surface horizon (e.g., 10 cm depth) of bare soil are often exceptionally "noisy" due to the influences of evaporation and water intrusion). In an aspect, at the depth of 10 cm under a plastic mulch, the pattern of the transitional zone is more evident, and is also found at deeper horizons in the soil profile. Such lack of negative deltas originates from air that is returning into the soil environment and the plant not being able to take up nutrients and water below the 10 cm horizon because lack of direct, rapid gas exchange to the atmosphere at such depths in the soil can limit availability of oxygen. This effect is referred to herein as the Gilbert Effect.

Figure 9:
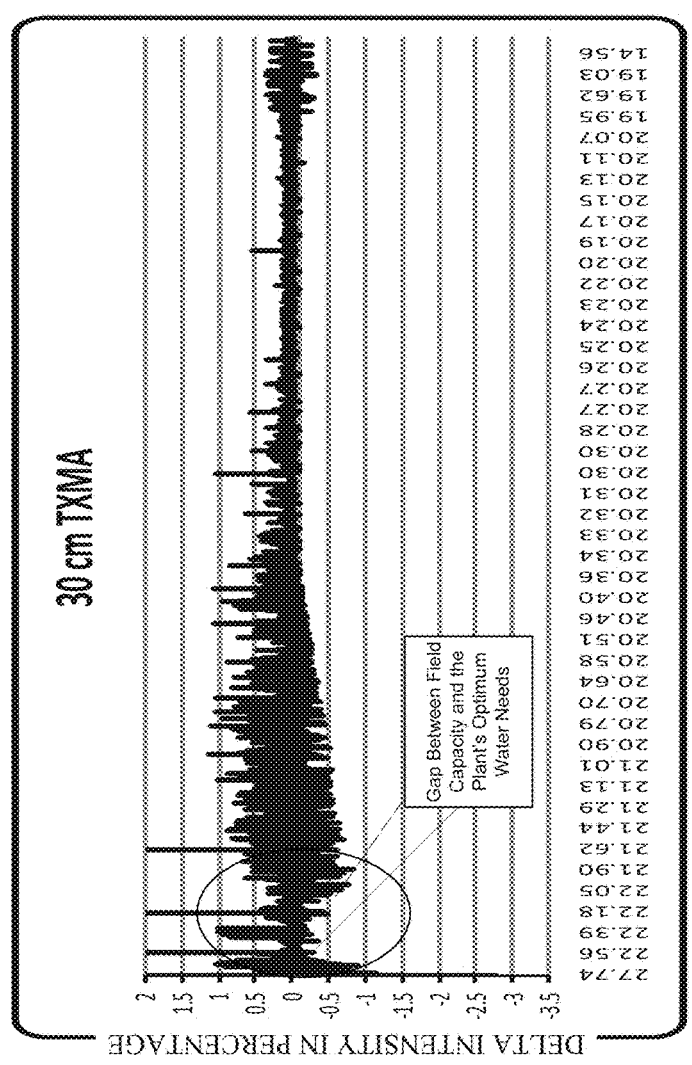
FIG. 9 is a Gap between Field Capacity and the Plant's Optimum Water Needs.

As described hereinbefore, field capacity is defined when the soil is in balance with air and water. Field Capacity is considered the optimum water level. FIG. 9 conveys that there may be a gap between field capacity and the zone where the plant's water extraction is highest.

Figure 10:
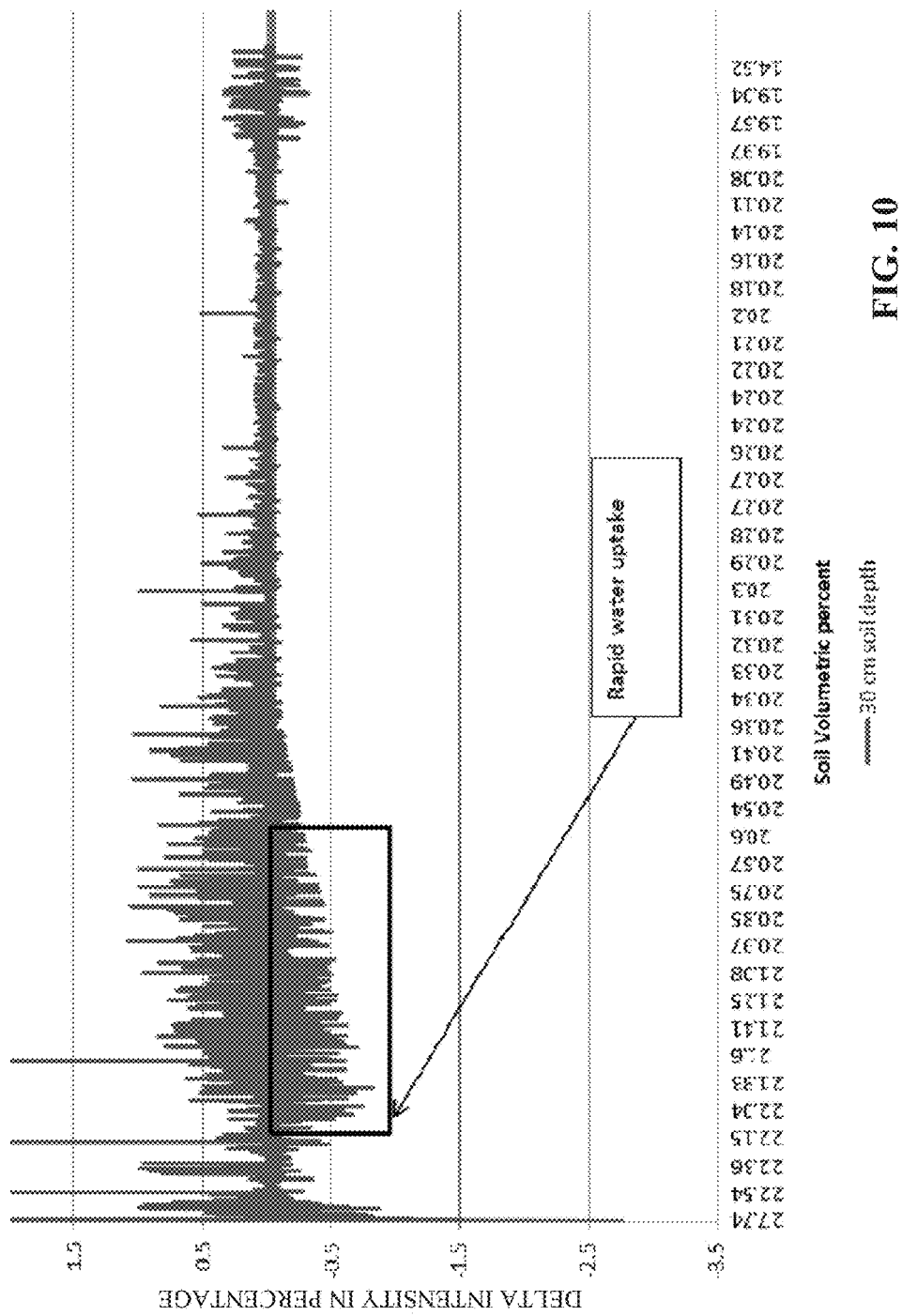
FIG. 10 is a Chart representing the Highest Negative Deltas.

FIG. 10 illustrates the location of rapid water uptake, e.g., large negative deltas in the region below field capacity. By plotting the information in this configuration, it is possible to identify the highest negative deltas below the field capacity mark and determine the optimum root moisture zone for maximum water uptake, which is herein referred to as $TX_{OSRWA}$. At these points of percent volumetric soil moisture, air and water exist at an optimum ratio in the soil, allowing enough air to provide oxygen for root metabolism and enough water to allow for expansion growth in roots, stems and leaves. FIG. 10 can be compared with those charts produced from other soil levels to form a complete diagnosis of the plant's active root zone. The $TX_{RMZ}$ (root management zone) is indicated as those zones within the soil profile where water uptake by a crop is occurring so that a grower can target this soil horizon as the place to which water and nutrients are to be driven utilizing a combination of fertilizer placement and irrigation.

Other manipulations of negative deltas, such as sums and differences, are used to compute critical indices, such as $TX_{RETo}$ (Root-derived ETo) and $TX_{IE}$ (Irrigation Efficiency).

Figure 11:
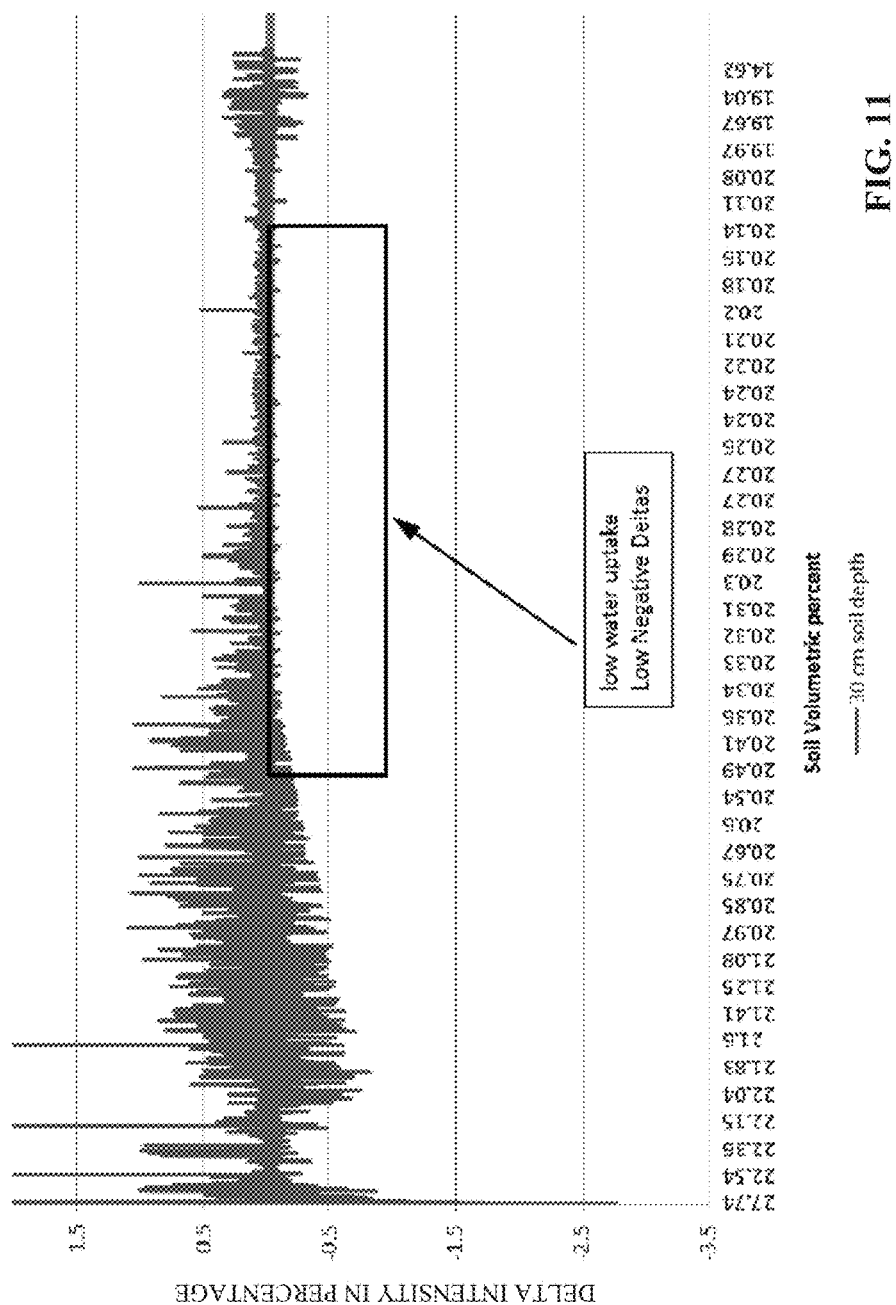
FIG. 11 is a Chart representing the Lowest Negative Deltas.

By reviewing FIG. 11, it is possible to determine what a plant determines as optimum. The high limit is 22.05% and the low is 20.79%. As a result, conclusions can be drawn that this circumstance is based upon root activity and not soil depletion at 30 cm.

FIG. 11 illustrates that the low negative deltas reflect no significant amount of water depletion for this band of soil profiles, so plants present in such soil are not consuming water. It would be a mistake to manage at this level. Such small negative deltas are likely involved in the redistribution of water within the measured zone from areas close to the probes to areas more remote from the probes, resulting in a normalization of the percent volumetric water content across the horizontal dimension of the soil profile. By examining the time stamp of these low-intensity negative deltas, it is observed that such deltas occur primarily at night, centering at 12 midnight. During these periods, root uptake (which can be defined by more-intense negative deltas) does not occur due to the lack of water uptake driven by the primary driving force, which is calculated as ETo, the Evapo-Transpirational Coefficient, for the evaporation of water from the substomatal cavities underlying the stomata in the leaf, which allows gas exchange between the boundary layer external to the leaf and the internal spaces within the leaf.

Figure 12:
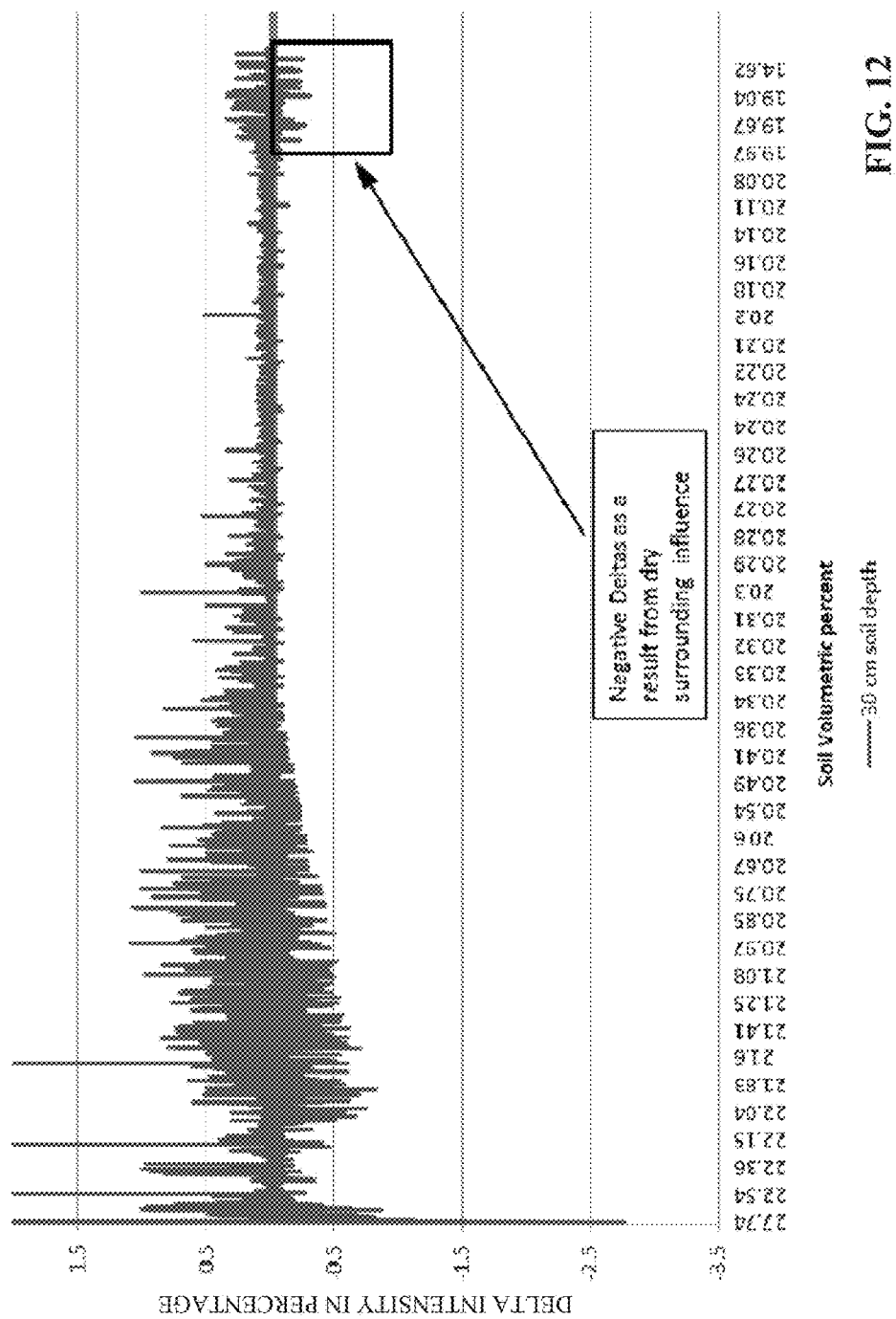
FIG. 12 is a Chart representing Additional Data Points.

FIG. 12 illustrates that the last block of data points shows why other levels (depths) are necessary for a proper analysis. In a scenario, by comparing data from additional levels, it can be determined that the upper levels became drier and the plant attempted to obtain water from this level (30 cm); such interpretation is supported by the fact that there are negative deltas in this zone. Conversely, this investigation may indicate that the 40 cm depth was dryer and the water needed to normalize, which also can produce a negative delta. An approach to distinguish between these two interpretations may be to examine the soil moisture levels in each zone with time stamps (e.g., data collection times) identical or nearly identical to those presented in FIG. 12.

FIG. 13 presents an overview of where the primary (or fundamental) data transformations exist ($TX_{MA}$) and the secondary calculations can be offered. In the agricultural sector, the primary data analysis is $TX_{MA}$, as described previously for water but which also can be performed for salt ions. As an example, analysis sections can be organized into water analysis, water management, irrigation analysis, salt ion analysis, salt ion management as the primary and secondary data manipulations that can be performed. Secondary calculations also can be performed, such calculations can be derived from the data produced in the $TX_{MA}$ calculations and supplemented by various interpretations related to how a crop has responded to the environment in which it is located. Secondary calculations with inputs that have been entered into a database by a grower or through the manipulation of data provided by other sensors, such as weather data. Certain results are not visible to the public but can be needed to make the calculation for displayed values and graphs. Most of the entire range of TX displays (charts, graphs, etc.) and numbers can have one or more inputs from the primary $TX_{MA}$ analysis.

Figure 14:
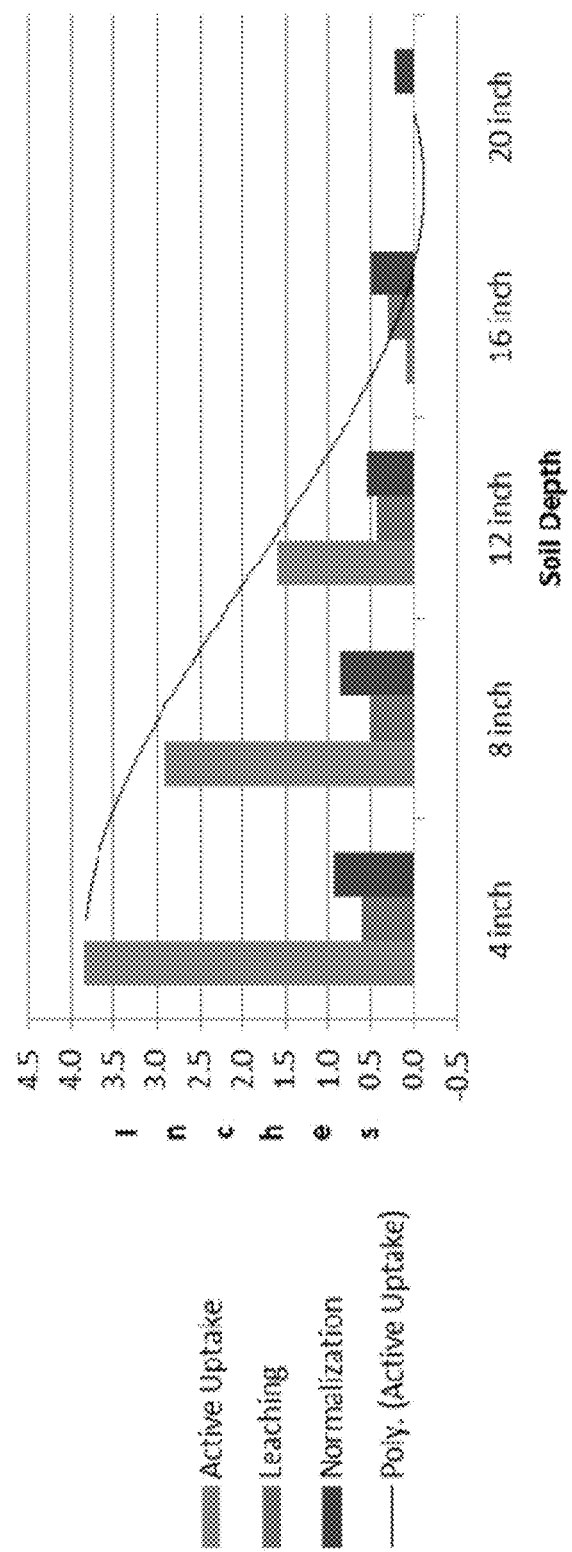
FIG. 14 illustrates $TX_{RETo}$ in accordance with aspects of the subject disclosure.

FIG. 14 illustrates $TX_{RETo}$ in accordance with aspects of the subject disclosure. $TX_{RETo}$ generally describes how water flows within the crop profile over a period of data collection, and how such information is calculated. In an aspect, all negative deltas of each depth over the period of data collection are summed and then convened to total water removed (in inches) by multiplying the sum by an empirical factor η (e.g., η=0.0393) to obtain the water (in inches) removed from the soil profile. Using negative deltas where the initial sensor reading was greater than the field capacity of the soil, such deltas can be summed and converted to inches of water that left the zone by leaching, and these numbers are subsequently not used in the calculations that follow. Using negative deltas where the absolute value of delta is less than 0.05, such deltas can be summed and converted to inches of water that moved via normalization. By summing the inches of water that left each zone by leaching and by normalization and subtracting this from the total water leaving each zone, the remainder is classified as the total water taken up by the plant and removed from the profile over the course of the period of data collection (e.g., plant uptake). It should be appreciated that such results also can include a small component of evaporation when the probes are installed on bare ground, but this would not occur when the crop is grown on plastic mulch.

By computing the plant uptake component of a specific crop, variety, crop stage and soil type, a large database can be created. In an aspect, the database can be more specific than an ETo soil-based irrigation database. Creation of such a large database can drive irrigation decisions based on artificial intelligence. Through user input, the software, when executed by a processor, can account for variations dependent on the varieties, soil type, location, and other relevant information (e.g., growth stage of the crop at various dates) that can be stored and cross referenced. The data can be analyzed agronomically via grow day/heat units to build a predictive model of the dates when the crop transitions from one growth stage to another (e.g., predicting the transition from vegetative to reproductive phases, or harvest dates). This can allow the software, when executed by a processor, to create models of predicted behavior so every site that shares the aspects of the crop, variety, soil and plating date may not need sensors.

Figure 15:
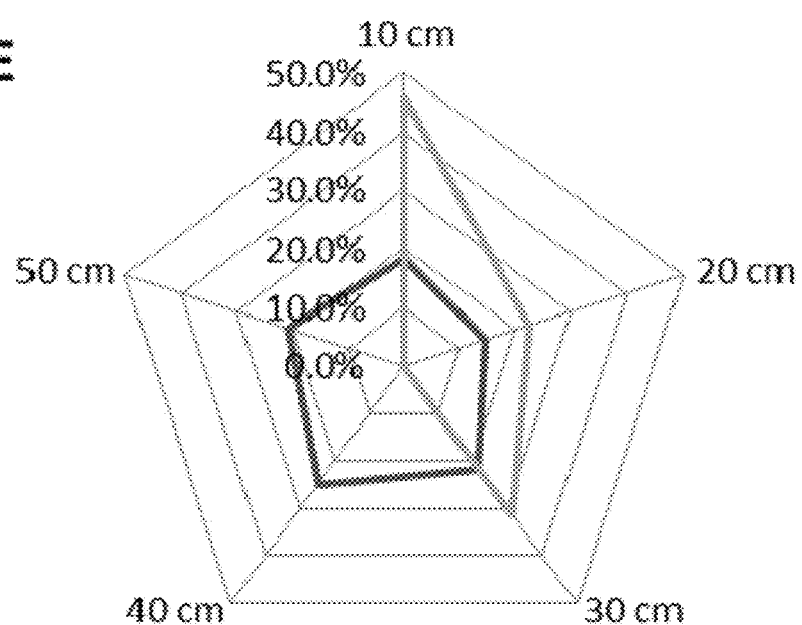
FIG. 15 illustrates $TX_{IE}$ (Irrigation Efficiency) in accordance with aspects of the subject disclosure.

FIG. 15 illustrates $TX_{IE}$ (Irrigation Efficiency) in accordance with aspects of the subject disclosure. Illustrated $TX_{IE}$ conveys the location in the soil profile of plant activity and water availability. The data computations in FIG. 15 are based on percent volumetric soil moisture over the entirety of a data collection period. By adding all the data readings for each sensor level (e.g., depth) and then converting the sensor readings into inches of water at each depth (for example, by multiplying by 0.0393), the totals of water available at each depth in the soil profile throughout the data collection period can be obtained. The sum of the total water at each depth can be computed to create a total of water in the entire soil profile. By dividing the sum of each depth by the total water available in the entire soil profile, the percentage of available water at each depth in the profile over the entire data collection period can be computed.

Using the data calculated in the $TX_{RETo}$ example described herein—the total water taken up by the crop and removed from the profile over the course of the data collection period (plant uptake)—, the summed plant uptake over the entire soil profile over the entirety of a data collection period can be divided into the total plant uptake at each depth over the entirety of the data collection period to calculate the percentage of water taken up by the crop at each depth. By comparing the percentage of water available at each depth to the percentage of water taken up by the crop, the data presented in FIG. 15 can be obtained. Such determination is referred to as $TX_{IE}$, or irrigation efficiency, to indicate whether plant uptake matches the locations where water is present, or not.

Figure 16:
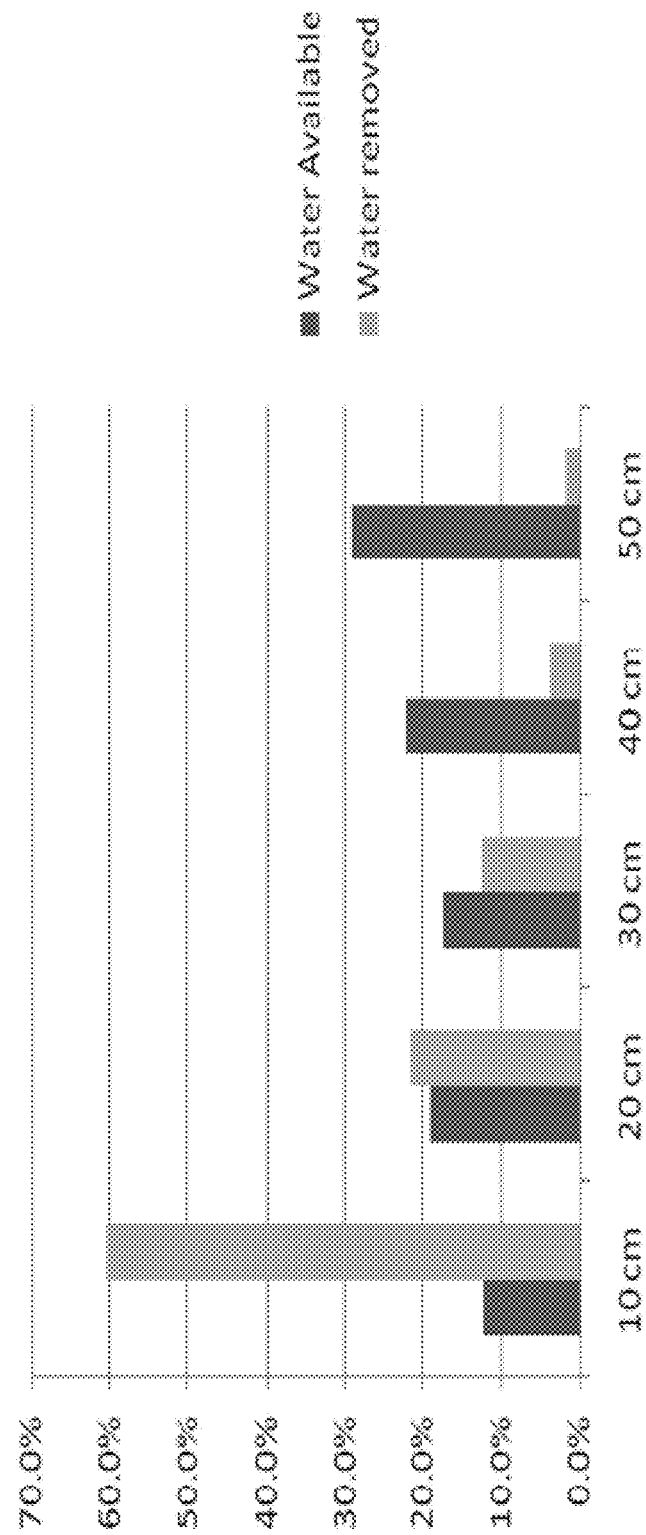
FIG. 16 illustrates the location of plant activity in accordance with aspects of the subject disclosure

FIG. 16 illustrates the location of plant activity. As a result of measuring the deltas at each level (depth) the ratio regarding where the plant extracted water and where the water it left the level (depth) in question can be established.

The data computations in FIG. 16 are the gross ratios. By adding all the data readings for each sensor level (depth) totals can be obtained. Subsequently dividing the individual readings by the sum of the totals results in the percentage each level averaged over the data time line. The same is done with the negative deltas and the comparison is shown in FIG. 16. Because the $TX_{MA}$ has computed the saturation base line all the negative deltas can be subtracted from the total to obtain an adjusted reading that reflects water movement in the soil profile.

Most roots do not take water up in a significant volume at night. Accordingly, by means of filtering out the night time data, the analysis can focus on what the plant needed and not total water movement. This methodology generates a chart that is much more accurate. This sorting and filtering of data is based on an understanding of how the media (soil) reacts to inputs, all of which is precisely monitored.

Figure 17:
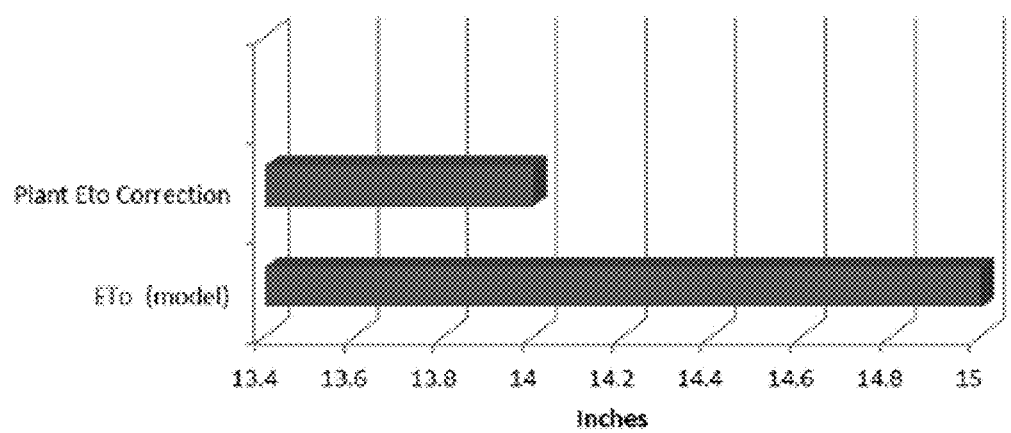
FIG. 17 depicts $TX_{PEToC}$, which compares calculated water uptake by a crop with theoretical demand for water by the crop, calculated as ETo, over the entirety of a data collection period.

FIG. 17 depicts $TX_{PEToC}$, which compares calculated water uptake by a crop with theoretical demand for water by the crop, calculated as ETo, over the entirety of a data collection period. The calculated water uptake is based upon the horizons within the soil profile where water uptake by the crop has been noted. The active root zone ($TX_{RMZ}$) can be identified by starting at the soil surface and adding the amounts of water (e.g., in inches) that have been calculated to be taken up by the crop (e.g., plant uptake) until an amount greater than about 80% of the total water taken up by the crop is reached. This is then compared to the total water demand, e.g., a summation of daily computations of ETo. The actual use of the water taken up by the crop is a much fairer (and logical) indicator of resource use than a theoretical calculation of the demand exerted by weather factors alone, and is more suited for sustainability metrics than ETo.

Another calculation that the systems and methods disclosed can perform includes quantifying rainfall and irrigation events under a center pivot, linear pivot, or any other sprinkler irrigation system, using soil moisture probes. An example of the positive deltas of percent volumetric soil water moisture readings at various depths over a data collection period is provided the table presented in FIG. 18. In these cases of sprinkler irrigation or rainfall, water is introduced into the soil profile from above the surface of the soil into the uppermost horizon (usually, the sensor at the 10 cm depth), either remaining in the 10 cm horizon or, when that horizon reaches field capacity, the water can move downward into the next deepest soil horizon (e.g., 20 cm horizon). In an aspect, software that implements a disclosed method can check, when executed by a processor, that the percent soil moisture content readings are above the field capacity of the soil, e.g., as determined either by entering the apparent field capacity of the soil into the software, or using automated field capacity calculation described herein. When that criterion is fulfilled, the resulting positive deltas greater than 0.05 that occur (at time when water is entering the soil and increasing the percent volumetric water content) are collected until no more consecutive positive deltas are identified, and then each are summed. In FIG. 18, positive deltas are occurring from 7:15 PM to 8:15 PM in the 10 cm column. Once two consecutive positive deltas are identified, the software, when executed by a processor, can check the next deepest horizon and can begin to scan that zone for positive deltas. In FIG. 18, it can be seen that positive deltas are present in the 20 cm column from 9:15 PM onwards Once two consecutive positive deltas are identified in the second deepest zone, the software again checks the next deepest zone for positive deltas (30 cm in this case), and the process repeats. After no more consecutive deltas in the 10 cm horizon occur (at times after 8:15 PM), the collection of data is halted in all zones at 8:15, and only those up to 8:15 PM in all the zones are summed. The total water added to the profile is then summed over all the depths in which positive deltas are identified. The data (as percent soil moisture content) can be further converted to inches by multiplying by a conversion factor η (e.g., η=0.0393) for inclusion in the $TX_{LF}$ (leaching factor) calculation, or kept in the percent soil moisture content form and employed to calculate leaching that is documented and reported in the $TX_{RETo}$ calculation. In distinguishing the source of the water that entered the profile (by irrigation or by rainfall), the time stamps of the percent soil moisture content can be correlated where the positive deltas occurred to the time stamps of pressure sensors mounted on overhead sprinklers or pivots (for irrigation) or rain buckets located outside the irrigated zones (for rainfall). The resulting sum calculation is then placed into either to $TX_{TI}$ (Total Irrigation) or to $TX_{TR}$ (Total Rainfall).

In an embodiment, software implemented in accordance with aspects of the subject disclosure can enable a tool for analyzing and then optimizing drip irrigation parameters (e.g., length of the irrigation period, interval between irrigation events), referred to as $TX_{DIM}$, under the control of a grower or most any actor executing the software. In an aspect, optimizing the length of the irrigation period can be implemented by monitoring the positive deltas at two probes during and immediately after an irrigation event. The sum of the positive deltas from the top three soil depths (usually the 10, 20 and 30 cm levels, but this can be modified if the active root zone ($TX_{RMZ}$) extends beyond 30 cm) can be calculated and then compared. If the sum of the positive deltas at the probe, at the emitter, and at the probe between the emitters match each other (to within 10%, for example), the emitter spacing is correct as well as the length (e.g., time interval) of the irrigation period. If the sum of the positive deltas of the probe between the emitters is lower than that of the sum of the deltas of the probe at the emitter, then either the spacing between the emitters is too large or the irrigation interval is too short. On subsequent irrigations, the duration of the watering period is lengthened until either the sums of the probe at the emitter are equal to the sum of the probe between the emitters, or the positive deltas of the probe at the emitter extend beyond the root zone (40 and 50 cm). In the latter case, the appearance of positive deltas at depths below the root zone indicate that leaching is occurring, and the length of the irrigation period should be reduced until leaching is no longer observed.

In a scenario in which the sum of the positive deltas of the probe at the emitter is lower than the probe between the emitters, the spacing between emitters is too low and should be lengthened in subsequent year(s), once the irrigation period duration is determined This type of information can be displayed in a variety of ways. In one aspect, the information that is calculated can be positioned using an "eye bubble level". One axis of the "crosshairs" can be the duration of the irrigation, while the other axis can be the interval between irrigations. The current situation of the grower's data is displayed on such chart, and this will change as the grower attempts corrections to the irrigations.

The previous examples are provided for soil moisture analysis. The methods and systems are equally applicable to many different types of analysis. Table 3 provides an overview of exemplary types of analyses contemplated. Table 3 lists additional TX analyses.

TABLE 3

| TX Identification | TX Definition | TX Description | Additional Information | Type of Display |
|---|---|---|---|---|
| $TX_{AFC}$ | Average Fertilizer used in a Crop | Computes the fertilizer use over many plantings | Needs $TX_{CDM+}$ | Dashboard |
| $TX_{AGD}$ | Average Grow Days for crop "X" | Computes average grow day for a specific crop | Needs $TX_{CDM+}$ | Dashboard |
| $TX_{DD}$ | Data Days | The number of days data is collected | | Number |
| $TX_{DE}$ | Drought Efficiency | Compares root uptake to production | Compares root uptake to variety | Pie Chart |
| $TX_{DIM}$ | Drip Irrigation Management | Use a circle level eye chart | Used to know when to start an irrigation and for how long | Level Bubble |
| $TX_{ED}$ | Executive Dashboard | View multiple manageable information on one screen | Programmable in AdviroGuard | Horizontal Bar Graph |
| $TX_{ETO}$ | Evaporation Transpiration | Used to write models for agriculture | Multiple pivots with one correction sensor | Number |
| $TX_{GD}$ | Grow Days | Computed from $TX_{CDM+}$ | Plant Date/Last Harvest date | Number |
| $TX_{IE}$ | Irrigation Effectiveness | Total water available vs. total water withdrawn | | Bar Graph |
| $TX_{IM}$ | Irrigation Management | When played will show water movement in soil | Show salt movement with the water | Animation |
| $TX_{IZ}$ | Irrigation Zone | Shows min and max water in soil profile for optimum growth | | Bar Graph |
| $TX_{LF}$ | Leaching Factor | Compare water accumulation zones | % of Deltas in root zone vs. below root zone | Number |
| $TX_{MA}$ | Media Analyzer | Deltas plotted on line graph | Contains positive and negative delta. | Line Graph |
| $TX_{NAE}$ | Nutrient Application Efficiencies | Compares production output to nutrient input | Nitrogen, Phosphorous, Potash | Horizontal bar graph |
| $TX_{NAH}$ | Nutrient Application History | Plot all data points | Polynomial trend data | Time line graph |
| $TX_{NDD}$ | Nutrient Distribution Drift | Each sensor listed at beginning and end | Delta of first and last data point is ratio | Table format |
| $TX_{NE}$ | Nutrient Efficiency | Total nutrients applied vs. total nutrients withdrawn | Needs $TX_{CDM+}$ | Bar Graph |
| $TX_{NMM}$ | Nutrients Min Max | Displays Highest, lowest, Beginning and Last readings | For each level of data collection | Bar Graph |
| $TX_{OA}$ | Optimum Allowance | Calibration comes from the $TX_{MA}$ | Adjust through season | Number |
| $TX_{OOA}$ | Out of Allowance | Send alarm via email, text message | Based on limits from consumer | Number |
| $TX_{ORT}$ | Optimum Run Time | Sums displacement of water in the management zone | Calculates pumping capability and convert to minutes | Number |
| $TX_{OSRWA}$ | Optimum Soil Ratio Water/Air | Close to field capacity but not necessary the same | Calibration comes from the $TX_{MA}$ | Number |
| $TX_{PEToC}$ | Plant ETo Coefficient | Measure water used total compared to ETo total for same time span. | | Number |

TABLE 3-continued

| TX Identification | TX Definition | TX Description | Additional Information | Type of Display |
|---|---|---|---|---|
| $TX_{PETE}$ | Production ET Efficiency | Measure water used in production compared to ETo | | Number |
| $TX_{PP}$ | Plant Problems | Looks for slow down growth not being water deficiency | | Bar Graph |
| $TX_{PWE}$ | Plant Water Efficiency | Estimate lb of water in production to total water used | | Number |
| $TX_{RD}$ | Report Days | Number of days the report covers | Can be inside or outside of data days. | Number |
| $TX_{RETo}$ | Root Evaporation Demand | Highlights water movement throughout the soil profile over the season; Includes leaching evaporation and movement through the plant | | Number |
| $TX_{RMZ}$ | Root Management Zones | To be calculated from $TX_{MA}$ | Recalibrates on the fly | Number |
| $TX_{WNAR}$ | Water and Nutrient Ranking | Derived from data base | Works like the "energy star" | Bar Graph |
| $TX_{RSL}$ | Restrictive Soil Level | Will be calculated by deltas | Base line to come from 8 inch | Number |
| $TX_{SD}$ | Stress days | Reading over optimum is air stress | Readings under optimum allowance is water stress | Number |
| $TX_{SG}$ | Spray Guide | Runs off disease index models | | Resettable Bar Graph |
| $TX_{TCC}$ | Total Carbon for Crop | To run off university data | | Dashboard |
| $TX_{TFA}$ | Total Fertilizer Applied | All elements if listed in Data Correlator | | Dashboard |
| $TX_{TPT}$ | Total Pumping Time | Estimated or measure from pressure switch | | Dashboard |
| $TXT_{WA}$ | Total Water Applied | Sum of all sensors collecting water information | | Dashboard |
| $TX_{VG}$ | Value Gauge | Measures gap for current practice by using technology | Real time | Bar Graph or Speed Odometer |
| $TX_{WAH}$ | Water Application History | Data point plotted over time | Industry standard | Time Line Graph |
| $TX_{WLR}$ | Water Level in Water Reserve | Can be displayed in inches, feet or area inches | | Dashboard |
| $TX_{WLW}$ | Water Level in Well | Displayed in inches or feet | | Dashboard |
| $TX_{WUA}$ | Water Uptake vs. Availability | Helps detect leaching | | Number |

Figure 19:
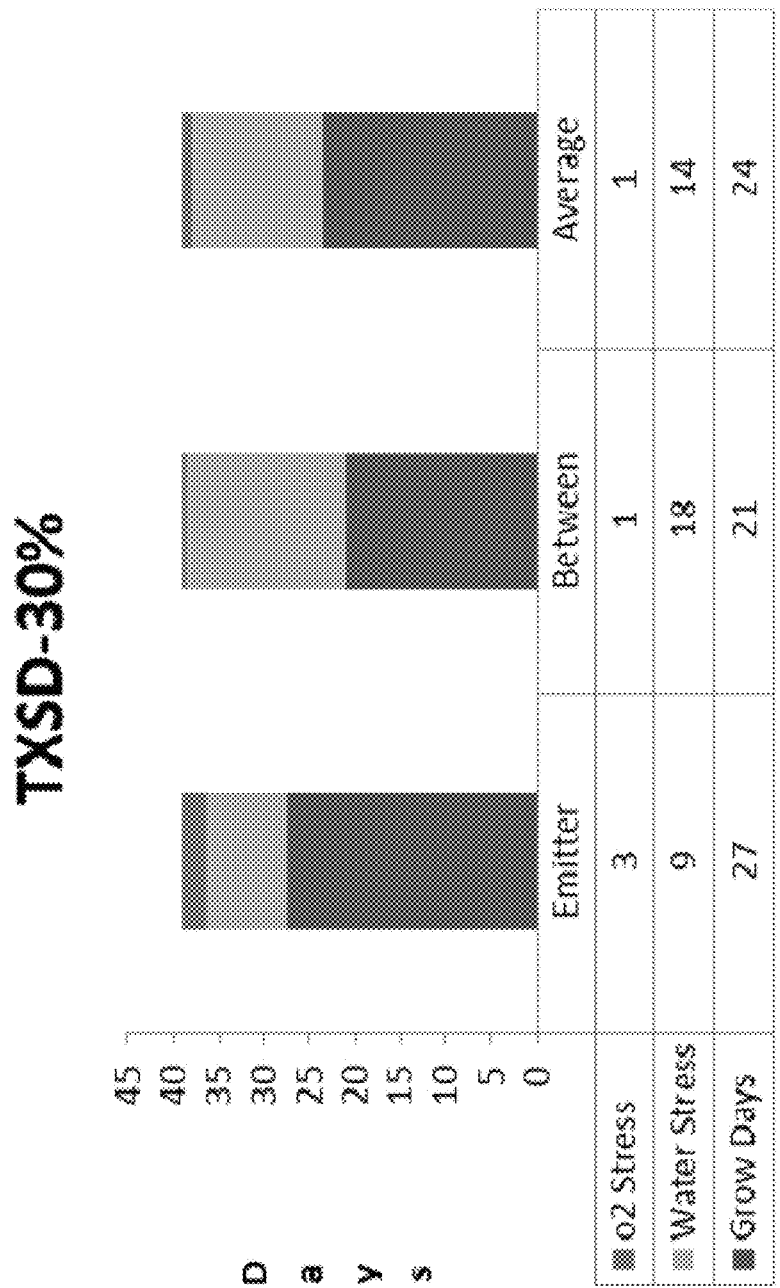
FIG. 19 illustrates a chart for stress days analysis in accordance with aspects of the subject disclosure.

FIG. 19 illustrates a chart for stress days analysis in accordance with aspects of the subject disclosure. The $TX_{SD}$ chart in FIG. 19 totals the percent volumetric soil moisture readings above the optimum and records that as periods when the crop is under oxygen ($O_2$) stress. This means that the water level has displaced the oxygen, resulting in the absence of active uptake of nutrient ions in that zone and a corresponding situation where a plant does not grow. It is noted that though counted in minutes, time is displayed in days. The water stress days represent the total time where percent volumetric water content is below the lower optimum or below the optimum level within the active root zone ($TX_{RMZ}$). Grow days correspond to the time the total water profile was within the optimum zone. The software checks, when executed by a processor, for root growth by analyzing for the negative deltas associated with movement associated with plant uptake and expands the root zone as needed. As a result, the output is more reflective of the plant activity and not soil moisture profiles. Stress day accumulation (of both $O_2$ and water stress) can result in lower crop yield. Accordingly, such stress information is an important factor to monitor during crop production as it can be viewed as an indicator of final yield, and be used in computing potential benefits that can be compared to crop production costs when deciding to invest resources in maintaining or improving crop health. It should be appreciated that yield information allows, at least in part, ranking one or more of the input efficiencies associated with irrigation or, more generally, resource distribution.

FIG. 20 presents a table with a set of exemplary readings that illustrate stress in accordance with aspects of the subject disclosure. In this example looking at 30 cm, if 20% is the low limit and 22% is the high limit as compared to the optimum water zone, then the first 9 readings were water stress while the last 6 are in the optimum zone.

Figure 21:
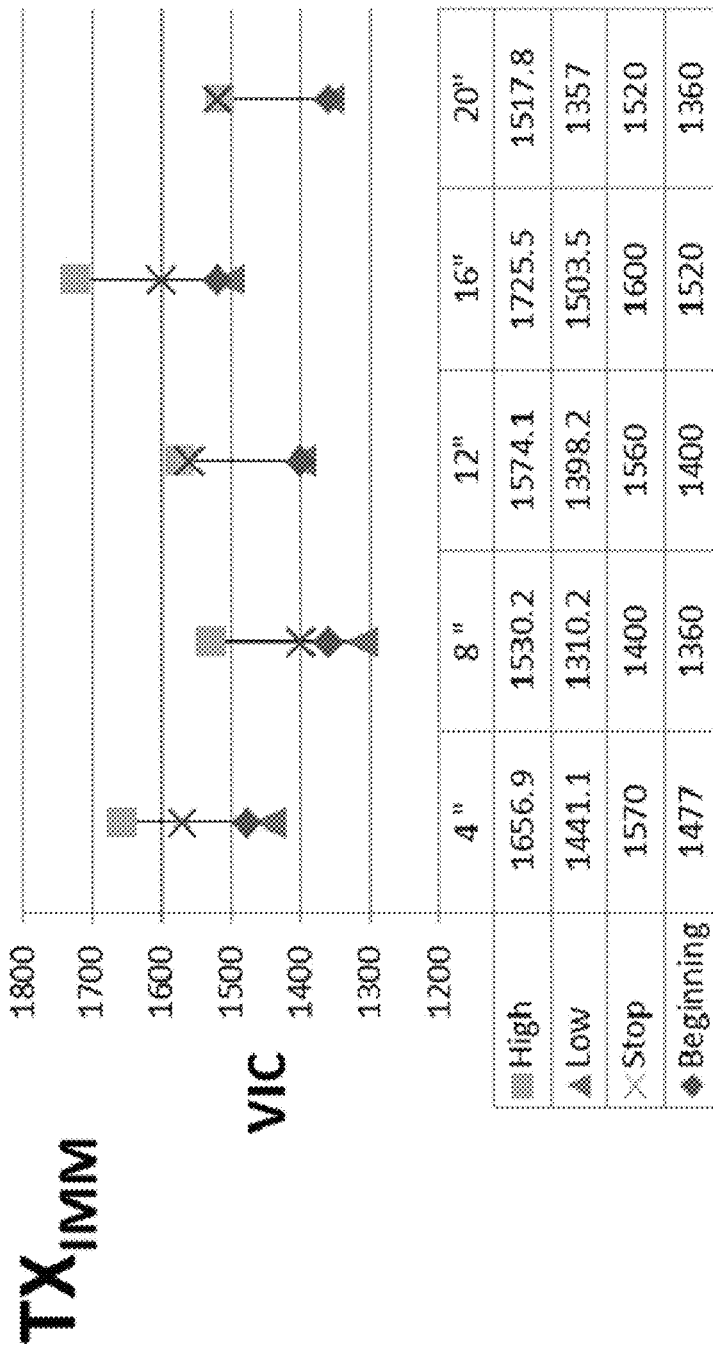
FIG. 21 illustrates Ion Minimum and Maximum observed in the soil profile over a data collection period in accordance with aspects of the subject disclosure.

FIG. 21 illustrates $TX_{IMM}$, which is the ion minimum and maximum observed in the soil profile over a data collection period in accordance with aspects of the subject disclosure. The data is fitted to a trend line (e.g., a polynomial of sixth order in the argument) prepared at the end of the data collection period. A software implementation, executed in a computer, can read a first calculation of the trend line at each depth (e.g., 10 cm through 50 cm at most times) through to the final calculation, either at harvest (in case the probe is still installed) or at the last data point when the probe is removed from the soil (whichever comes first). Such software implementation, executed in the computer, can scan the raw data for the highest and lowest value over the entirety of the data collection period. Such values can be plotted on a graph, with the X-axis as the depth in the soil and the Y-axis as the values of the individual points measured (high, low, start, finish). A trend line can then calculated, by the computer that executes the software implementation, using the final points at each depth as a polynomial of sixth order in the argument. This allows identification of the final end-point of ions over the data collection period, as well as the highs and lows through the season, to understand how the ion content of the soil has changed over time.

FIG. 22 presents $TX_{IDD}$, which is the Ion Distribution and Drift calculation made on ions observed in a soil profile in accordance with aspects of the subject disclosure. The values are reported for each sensor depth, as well as the Below Root Zone (BRZ). In most scenarios the root zone (RZ) is set at 30 cm, unless the calculation of the root zone from $TX_{RETo}$ data indicates some other level as the RZ. The start and finish values are taken from the $TX_{IMM}$ analysis, and the percent BRZ is calculated as the sum of the values outside the root zone divided the sum of all the values in the entire root zone. The same analysis is made for the values at finish (e.g., end of the data collection period), to allow an understanding of the difference in distribution before and after the crop is harvested. Drift is calculated as the new change in ion values (finish minus start)/start, displayed as a percent), with a negative value indicating that more ions were present at the start compared to the finish.

Figure 23:
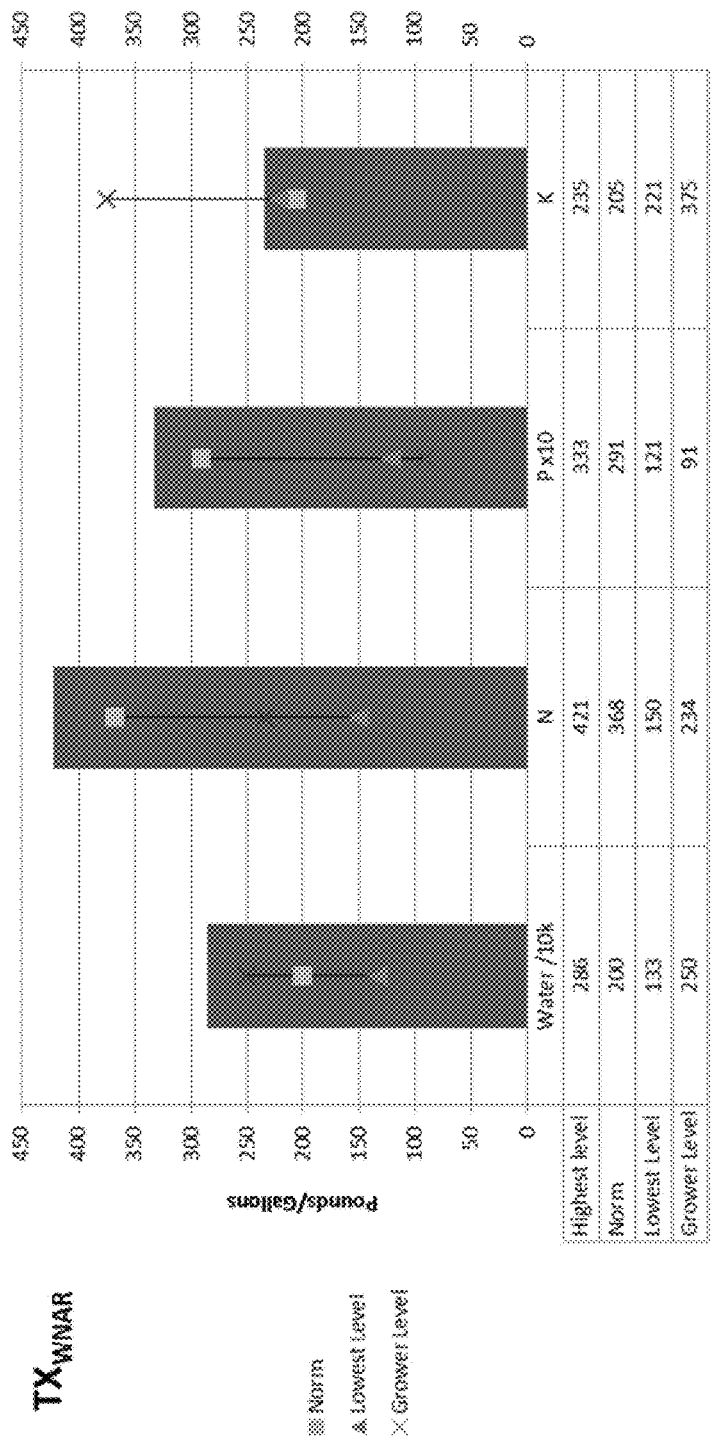
FIG. 23 illustrates Water and Nutrient Application Ranking in accordance with aspects of the subject disclosure.

FIG. 23 illustrates $TX_{WNAR}$, which is a Water and Nutrient Application Ranking, in accordance with aspects of the subject disclosure. $TX_{WNAR}$ presents the weight of the harvested commodity divided by the amounts of water (W) and nutrients (such as nitrogen (N), phosphorus (P), potassium (K), or the like) reported by a client as being applied to the crop during the entirety of a data collection period. It can be compared to the ratios listed in a database or listed in reference handbooks and/or websites as the highest values recorded (H), the lowest recorded (L) and the norm of the all the values recorded (N). The values for H, N and L are based on existing values of yield and nutrient applications in the database for the specific variety planted by the grower. In the absence of data for the variety in the database, the comparison is made with values appropriate to the crop. If the data in the database does not include values of at least 20 data collection periods (e.g., 20 complete seasons), values available in the literature are employed. The value for the nutrients applied and crop yield for current season can be entered by a grower as part of a Client Data Management function; such value is referred to as the customer (C) value. That value stands on its own, and can replace the H or L values used previously in any subsequent analyses based on that crop and/or variety. The water used is calculated as in the $TX_{RETo}$ example for active plant uptake. These customer entries, besides comparing these to historic data, can also allow ranking of a series of growers as to their efficiencies for nutrient and water applications in a current season or a region.

FIG. 24 illustrates $TX_{PWE}$, which is Plant Water Efficiency and is a calculation that includes the efficiency of a crop to convert water extracted from the soil into a harvestable commodity. In this case, the weight of water in the harvest commodity is divided by the water taken up by the plant (e.g., inches converted to gallons) in $TX_{RETo}$ calculations described hereinbefore. With this measurement, the direct measurement of water acquired by the crop derived from soil moisture data is employed, rather than an estimate derived from grower input, for example. In an aspect, $P_{WE}$ stands as an objective calculation of crop water use efficiency because the ratio, in part, can be validated by a value stored within a database that was electronically captured and verifiable. In certain embodiments, such database can be part of or be functionally coupled to the UID. In another aspect, $P_{WE}$ also represents an actual use of the water by the plant, rather than an estimate of water applied, which may include water lost to leaching, run-off into surface water, or movement into soil zones where the crop is not actively taking up water.

Figure 25A:
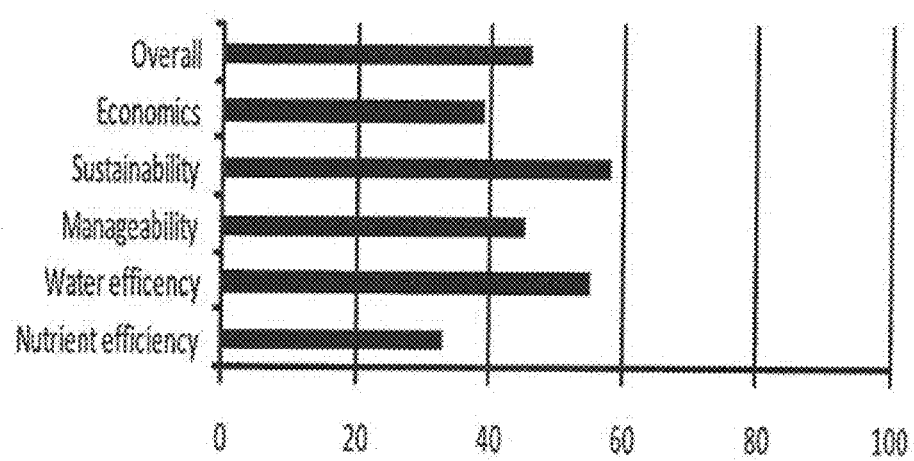
FIG. 25A illustrates an exemplary chart representing Executive Dashboard in accordance with an aspect of the subject disclosure.
Figure 25B:
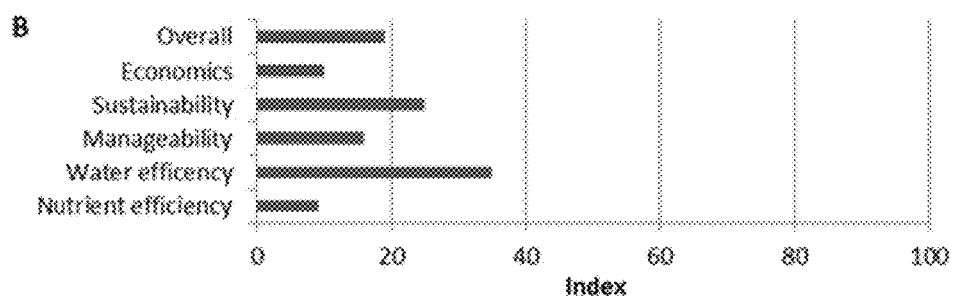
FIG. 25B illustrates an exemplary chart representing Executive Dashboard in accordance with an aspect of the subject disclosure.

In another aspect, illustrated in FIG. 25A and FIG. 25B, provided is a widget that can be placed on a computer desktop. The widget can have access to real-time data and be updated regularly. Such widget is a user configured gauge. The user can choose from any gauge from the modules they have purchased. The data will reflect the current status based on benchmarks they set. A default setting can be established but can be changed. The higher the reading, the more management needed or room for improvement. The scale 0 to 100 represents a value line and is not intended to be an actual reading.

In another aspect, provided are methods for proper sensor placement. The proper placement of sensors can result in higher quality data. Whether working within the agricultural community, the turf industry or various environmental sectors, applicable sensors can be placed in repeatable and precise patterns. Regardless of the media, provided are methods for placement in different circumstances.

In one aspect, soil moisture interpretation necessitates the use of two precisely located sensors, since the critical interpretations include comparisons of responses of the sensors as well as the changes in the responses of each sensor. In certain embodiments, one sensor array (e.g., a probe) of one or more sensors is installed in the wettest pattern of the irrigation system. The other is placed in the driest portion. Both of which can be placed within approximately 150 feet of each other. An explicit procedure for each system is established to guide installers to ensure consistency in the installation process. In an aspect, one reason for installing two probes in a field is that if differences are seen during the field calibration, where water is added to the soil at the location of each probe until complete saturation of the entire profile is observed, one installation was not performed successfully (e.g., there are "air gaps" between the probe and the soil making the readings of that probe lower than the other, or if one probe reaches saturation substantially more quickly than the other, there is preferential movement of the water along the probe surface, indicating that there is not good contact of the soil to the probe surface). A second reason is that two probes together can verify the uniformity of water distribution over the targeted area. The "wet placement" is used to help understand if over-watering is occurring, such as leaching water and moving nutrients below the root zone. In drip-irrigated fields, the "dry placement" is used to determine when "pulse irrigation" is needed, as well as determining if the emitter spacing is appropriate for the soil type. In overhead irrigated fields, the "dry placement" is used to determine the uniformity of the irrigation and to assist in determining when to irrigate (using the average of the "wet" and "dry" locations). In an aspect, the wettest placement is used to help reduce the effect of over watering, moving water, and moving nutrients below the root zone. The dry placement is used to determine if irrigation is needed. The offset of two sensors also allows for a more accurate calculation of total water available if the entire soil surface is not being irrigated.

In an aspect, for sensor placement, the major soil type(s) that are present within a field should be understood. This is most easily accomplished by referring to a USDA or state soil survey map where soil textures are indicated, either directly based on field soil sampling where the texture is determined in a laboratory or by inference from other soil properties, such as electrical conductivity (EC). Both probes are then installed in the location in the field with the soil with the smallest water holding capacity, equating to the soil type with the largest proportion of sand (alternatively, the soil type with the smallest proportion of clay). In the absence of this information, one must identify the area within a field which drains the quickest, based on discussions with the grower or farm manager with experience in crops in the location.

Secondary considerations for probe placement are based on the type of irrigation that is available in the field. In the case of drip irrigation, the probes should be located between ⅓ and ⅔ the distance of the submain from the water source, and then ⅓ to ⅔ from the submain to the end of the laterals, as close to the center of the field as possible. The first probe is installed at an emitter on the lateral; the second probe is installed at distance from the first probe at 1.5 times the emitter spacing (so that the probe is located equidistant between two emitters). For center pivot irrigation, the uniformity of the output from the spans must be validated and the probes are placed somewhere within either of the last two spans from the pivot point, with the preference for the outer-most span. On fields with raised beds or hills, the first probe is placed off the bed or hill in the furrow, while the second probe is placed on the elevated portion of the row. Because the probes and the telemetry equipment must be protected from mechanical damage inflicted by tractor wheels and implements, preference is given for placing the probes in locations remote from the wheel tracks, as well as outside the boom on spray rigs.

The following outline represents exemplary precise sensor placement, which increases the quality of data collection within the agricultural sector.

Figure 26:
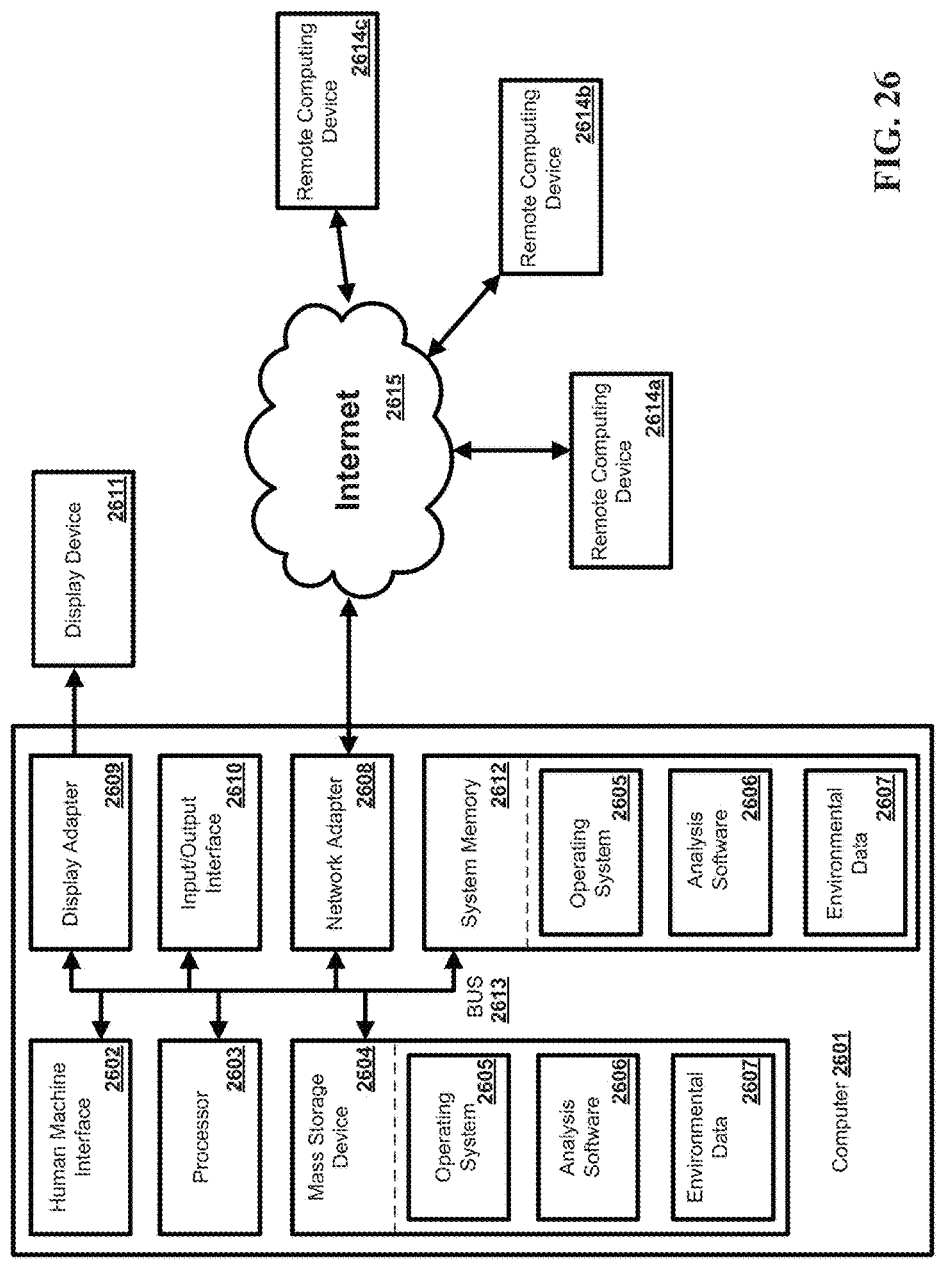
FIG. 26 illustrates an exemplary operating environment that enables aspects of the subject disclosure.

Drip
  Soil map
    Look for the best drained soil
    Make sure it is large enough
  66% to 80% down a lateral
  66% from the inlet sub main
  Sensor 1 at emitter
    Computes leaching time
    Salt movement
  Sensor 2 between the emitter
    To be installed 1½ time the emitter spacing from sensor 1
    Determines pulse frequency
    Salt movement
Center Pivot
  Soil map
  Used to find majority soil type
  Best drained if substantial
  Inside either of the last two spans from pivot point
    Uniformity test needed to position sensor
    Crop data base needed to position where in rows It should be appreciated that what has been provided is a functional description and that the respective functions can be performed by software, hardware, or a combination of software and hardware. FIG. 26 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The disclosed methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2601. The components of the computer 2601 can comprise, but are not limited to, one or more processors or processing units 2603, a system memory 2612, and a system bus 2613 that couples various system components including the processor 2603 to the system memory 2612. In the case of multiple processing units 2603, the system can utilize parallel computing.

The system bus 2613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCT), a PCI-Express bus, a Personal Computer Memory Card Industry Association (PCMCIA), Universal Serial Bus (USB) and the like. The bus 2613, and all buses specified in this description can also be implemented over a wired or wireless network connection and each of the subsystems, including the processor 2603, a mass storage device 2604, an operating system 2605, analysis software 2606, environmental data 2607, a network adapter 2608, system memory 2612, an Input/Output Interface 2610, a display adapter 2609, a display device 2611, and a human machine interface 2602, can be contained within one or more remote computing devices 2614*a,b,c* at physically separate locations, connected through buses of this form, in effect implementing a fully distributed system.

The computer 2601 typically comprises a variety of computer readable media. Exemplary readable media can be any available media that is accessible by the computer 2601 and comprises, for example and not meant to be limiting, both volatile and non-volatile media, removable and non-removable media. The system memory 2612 comprises computer readable media in the form of volatile memory, such as random access memory (RAM), and/or non-volatile memory, such as read only memory (ROM). The system memory 2612 typically contains data such as environmental data 2607 and/or program modules such as operating system 2605 and analysis software 2606 that are immediately accessible to and/or are presently operated on by the processing unit 2603.

In another aspect, the computer 2601 can also comprise other removable/non-removable, volatile/non-volatile computer storage media. By way of example, FIG. 26 illustrates a mass storage device 2604 which can provide non-volatile storage of computer code, computer readable instructions, data structures, program modules, and other data for the computer 2601. For example and not meant to be limiting, a mass storage device 2604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2604, including by way of example, an operating system 2605 and analysis software 2606. Each of the operating system 2605 and analysis software 2606 (or some combination thereof) can comprise elements of the programming and the analysis software 2606. Environmental data 2607 can also be stored on the mass storage device 2604. Examples of environmental data include, but are not limited to, nitrates in water, salt in water, chlorine in water and ozone in air. Environmental data 2607 can be stored in any of one or more databases known in the art. Examples of such databases comprise, DB2®, Microsoft® Access. Microsoft® SQL Server, Oracle®, mySQL, PostgreSQL, and the like. The databases can be centralized or distributed across multiple systems.

In another aspect, the user can enter commands and information into the computer 2601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 2603 via a human machine interface 2602 that is coupled to the system bus 2613, but can be connected by other interface and bus structures, such as a parallel port, game port, an IEEE 1394 Port (also known as a Firewire port), a serial port, or a universal serial bus (USB).

In yet another aspect, a display device 2611 can also be connected to the system bus 2613 via an interface, such as a display adapter 2609. It is contemplated that the computer 2601 can have more than one display adapter 2609 and the computer 2601 can have more than one display device 2611. For example, a display device can be a monitor, an LCD (Liquid Crystal Display), or a projector. In addition to the display device 2611, other output peripheral devices can comprise components such as speakers (not shown) and a printer (not shown) which can be connected to the computer 2601 via Input/Output Interface 2610. Any step and/or result of the methods can be output in any form to an output device. Such output can be any form of visual representation, including, but not limited to, textual, graphical, animation, audio, tactile, and the like.

The computer 2601 can operate in a networked environment using logical connections to one or more remote computing devices 2614*a,b,c*. By way of example, a remote computing device can be a personal computer, portable computer, a server, a router, a network computer, a peer device or other common network node, and so on. Logical connections between the computer 2601 and a remote computing device 2614*a,b,c* can be made via a local area network (LAN) and a general wide area network (WAN). Such network connections can be through a network adapter 2608. A network adapter 2608 can be implemented in both wired and wireless environments. Such networking environments are conventional and commonplace in offices, enterprise-wide computer networks, intranets, and the Internet 2615.

Figure 27:
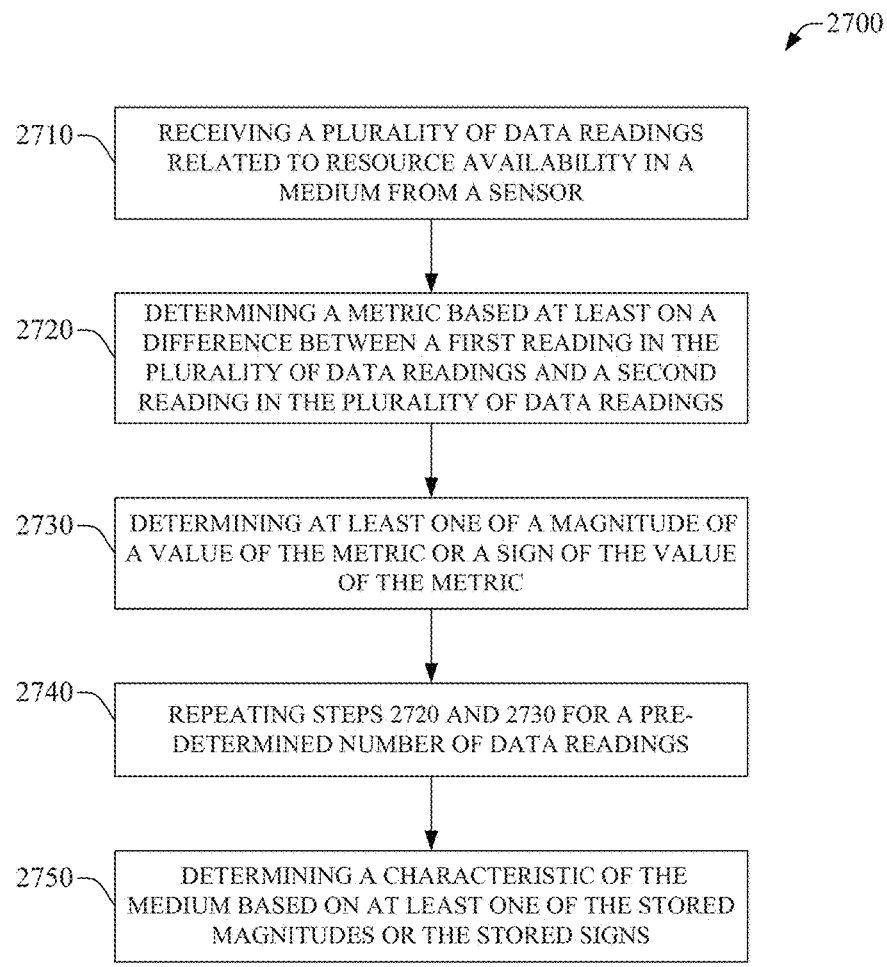
FIG. 27 illustrates an exemplary method for performing environmental monitoring in accordance with aspects of the subject disclosure.

For purposes of illustration, application programs and other executable program components such as the operating system 2605 are illustrated herein as discrete blocks, although it is recognized that such programs and components reside at various times in different storage components of the computing device 2601, and are executed by the data processor(s) of the computer. An implementation of analysis software 2606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. FIG. 27 illustrates a flowchart of an exemplary method 2700 for performing environmental monitoring according to aspects of the subject disclosure. At step 2710, a plurality of data readings related to resource availability in a medium is received from a sensor. In an aspect, the plurality of data readings related to resource availability in the medium is received from a plurality of sensors. In another aspect, the plurality of data readings comprises time-stamped resource measurements from a plurality of medium depths. The resource is moisture and the medium is soil. At step 2720, a metric based at least on a difference between a first reading in the plurality of data readings and a second reading in the plurality of data readings is determined. In an aspect, wherein determining a metric based at least on a difference between a first reading in the plurality of data readings and a second reading in the plurality of data readings comprises subtracting a value of the first reading from a value of the second reading, wherein the second reading occurred later in time than the first reading. At step 2730, at least one of a magnitude of a value of the metric or a sign of the value of the metric is determined. At step 2740, the steps 2720 and 2730 are repeated for a pre-determined number of data readings. The pre-determined number of data readings can comprise all the plurality of data readings. At step 2750, a characteristic of the medium is determined based on at least one of the stored magnitudes or the stored signs. In an aspect, determining a characteristic of the medium based on at least one of the stored magnitudes or the stored signs comprises determining a maximum magnitude of negative metric magnitude values. The method of claim 1, wherein the characteristic comprises one or more of, field capacity, leaching factor, Gilbert Effect, optimum soil ratio of water and air, root management zone, root-derived ETo, irrigation efficiency, plant ETo coefficient, drip irrigation management, stress days, plant water efficiency, ion distribution and drift, ion minimum and maximum, water and nutrient application ranking, total irrigation, total rainfall.

Figure 28:
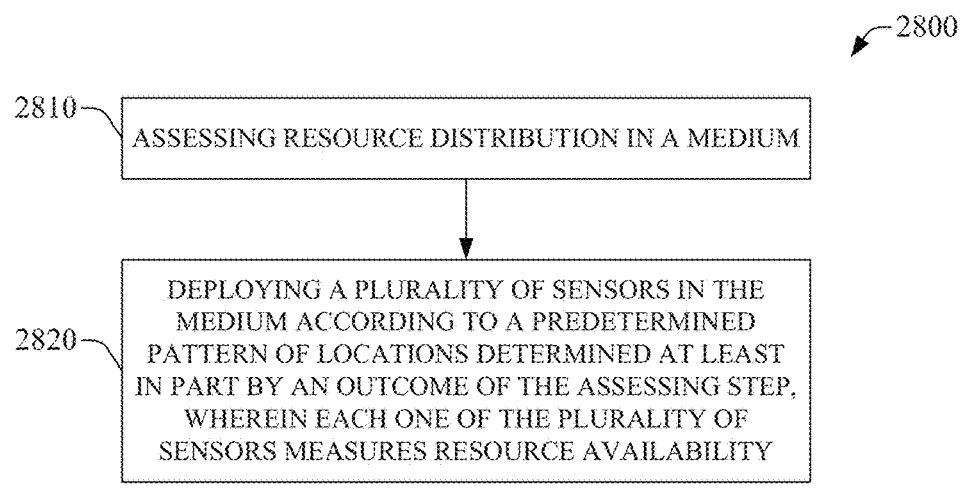
FIG. 28 illustrates an exemplary method for placing sensor in a medium to enable environmental monitoring according to aspects of the subject disclosure.

FIG. 28 illustrates a flowchart of an exemplary method 2800 for placing a sensor in a medium to enable environmental monitoring according to aspects of the subject disclosure. At act 2810, resource distribution in a medium is assessed. The resource distribution can comprise water irrigation including drip irrigation and center pivot irrigation. In an aspect, the assessing step comprises determining topography of a field comprising the medium. At step 2820, a plurality of sensors in the medium is deployed according to a predetermined pattern of locations determined at least in part by an outcome of the assessing step, wherein each one of the plurality of sensors measures resource availability. The plurality of sensors can comprise at least two sensors. In an aspect, a first sensor is deployed in a resource-rich location and a second sensor is deployed in a resource-depleted location. In another aspect, a first sensor is deployed in a location situated at a predetermined distance from a location of a second sensor. In yet another aspect, the predetermined pattern of location excludes at least one location adverse to sensor integrity.

Figure 29:
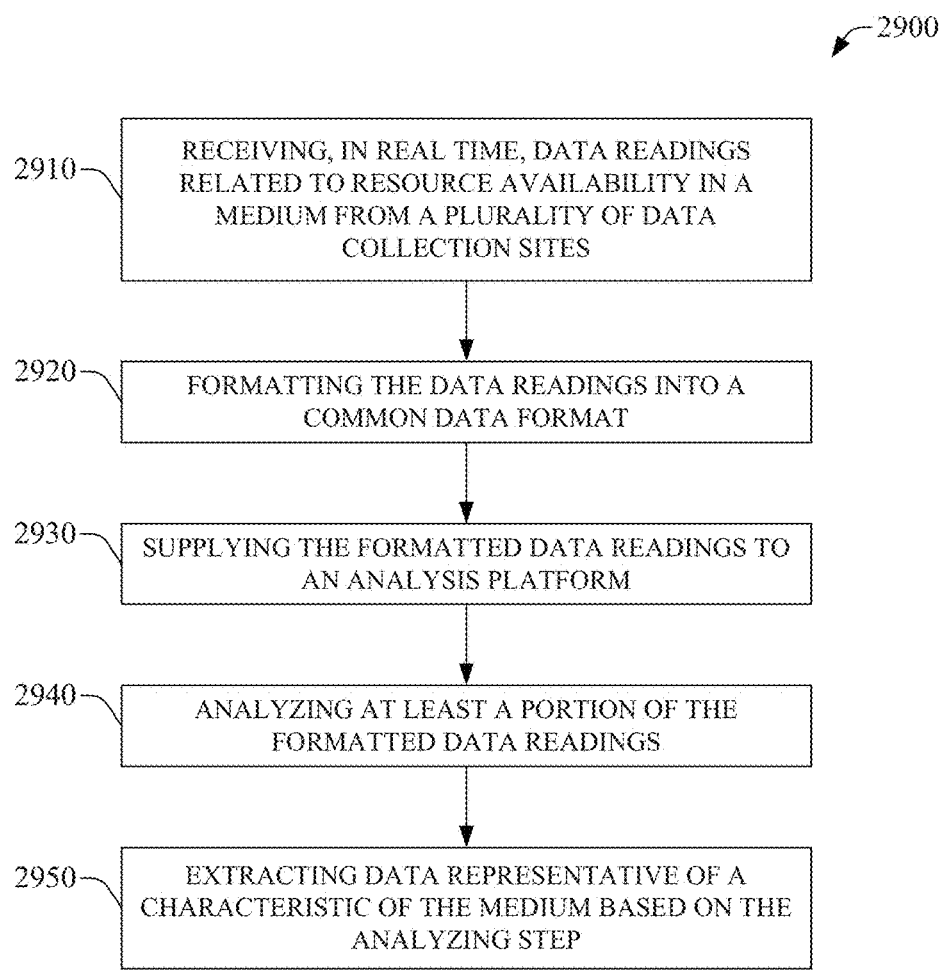
FIG. 29 illustrates an exemplary method for manipulating data related to environmental monitoring in according to aspects of the subject disclosure.

FIG. 29 illustrates a flowchart of an exemplary method 2900 for manipulating data related to environmental monitoring in according to aspects of the subject disclosure. At step 2910, data readings related to resource availability in a medium from a plurality of data collection sites are received in real-time. At step 2920, the data readings are formatted into a common data format. At step 2930, the formatted data readings are supplied to an analysis platform (e.g., $TX_{DP}$ processor). At step 2940, at least a portion of the formatted data readings is analyzed. At step 2950, data representative of a characteristic of the medium is extracted based on the analyzing step (step 2940).

Figure 30:
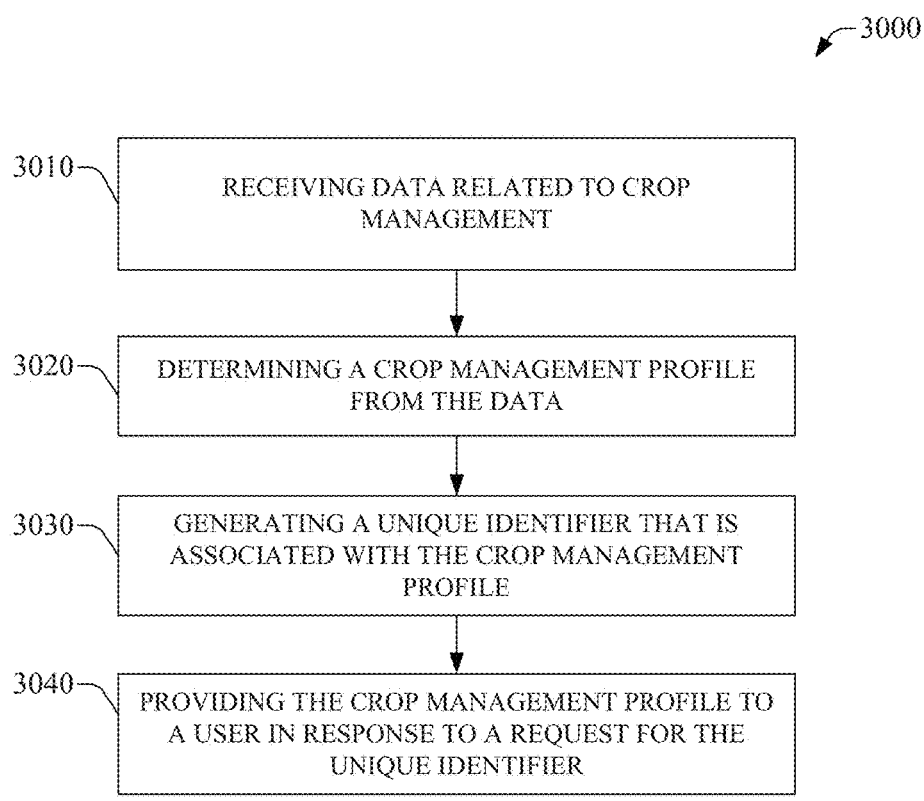
FIG. 30 illustrates an exemplary method for providing a crop management profile to a user in accordance with aspects of the subject disclosure.

In another aspect, illustrated in FIG. 30, provided are methods and systems for determining a crop management profile and providing the crop management profile to a user. More particularly, in an aspect, the method 3000 can comprise receiving data related to crop management at 3010, determining a crop management profile from the data at 3020, generating a unique identifier that is associated with the crop management profile at 3030, and providing the crop management profile to a user in response to a request for the unique identifier at 3040. In an aspect, the methods and systems provided herein can use environmental data, including, but not limited to, weather, soil moisture, soil salinity, as well as data supplied by the grower that defines the inputs used in crop production, including, but not limited to, tillage operations, crop protection product applications, fertilizer applications, and irrigation, to determine a crop management profile. The crop management profile can provide real-time analysis of measurements of crop water use efficiencies, crop nutrient use efficiencies, carbon footprints (total carbon used), and other production ratios that define the impact of crop management practices on the environment.

In an aspect, the data related to crop management can be received from a plurality of sensors. In another aspect, the data related to crop management can be received from a grower. More particularly, in an aspect, the environmental data can be collected by software provided herein, such as Adviroguard™. In addition to the analytical work performed by Adviroguard™, it can also serve as the repository for all the crop management data collected, as well as some of the analysis. Thus, all of the data collected, processed, and stored by Adviroguard™ for use in developing and executing management strategies, including, but not limited to, maximizing water use, improving fertilizer efficiencies, using insect and disease prediction models to time applications of fungicides and insecticides, can be presented to consumers who can track these management results for each crop either at the point of sale or through the web. In an aspect, a bar code, an RFID tag, a QR code, or another symbol can be associated with the crop management profile and can be affixed to a product at the time of harvest, thereby enabling the product to be followed through its chain of custody. In another aspect, the crop management profile can be provided to a user in response to a request for the unique identifier by displaying the crop management profile to the user at a kiosk or a website. For example, and not to be limiting, the website can be a social networking website such as Facebook, Twitter, LinkedIn, and the like.

More particularly, the methods and systems provided herein can use data collected and then processed by Adviroguard™ software as described herein to determine both in-season and season-end metrics. Season-end metrics can be calculated based on season totals and final yield to deliver such metrics like $TX_{WNAR}$ (water and nutrient application rankings) which are measures of the efficiency of resources used in crop production; $TX_{PWE}$ (plant water efficiency) which calculates the water in the harvestable fruit, grain, or vegetable divided by the amount of water taken up by the crop over the season; or $TX_{PETE}$ (production/ETo efficiency), which expresses the water contained in the total harvestable commodities divided by the sum of ETo calculations over the season. Other metrics can be calculated and updated each time data is retrieved by the server. In an aspect, metrics not dependent on having the final yield of a crop can be updated continuously through the season. These metrics include, but are not limited to, $TX_{RETo}$ (root-experienced evapotranspirational demand) which highlights the water movement throughout the soil profile over the season, including leaching, evaporation, and movement through the plant; and $TX_{IE}$ (irrigation effectiveness) which depicts the proportion of water and ions throughout the soil profile and where root uptake occurred, allowing a view of how well water and nutrient management practices placed these resources at depths where the roots were active.

Figure 31:
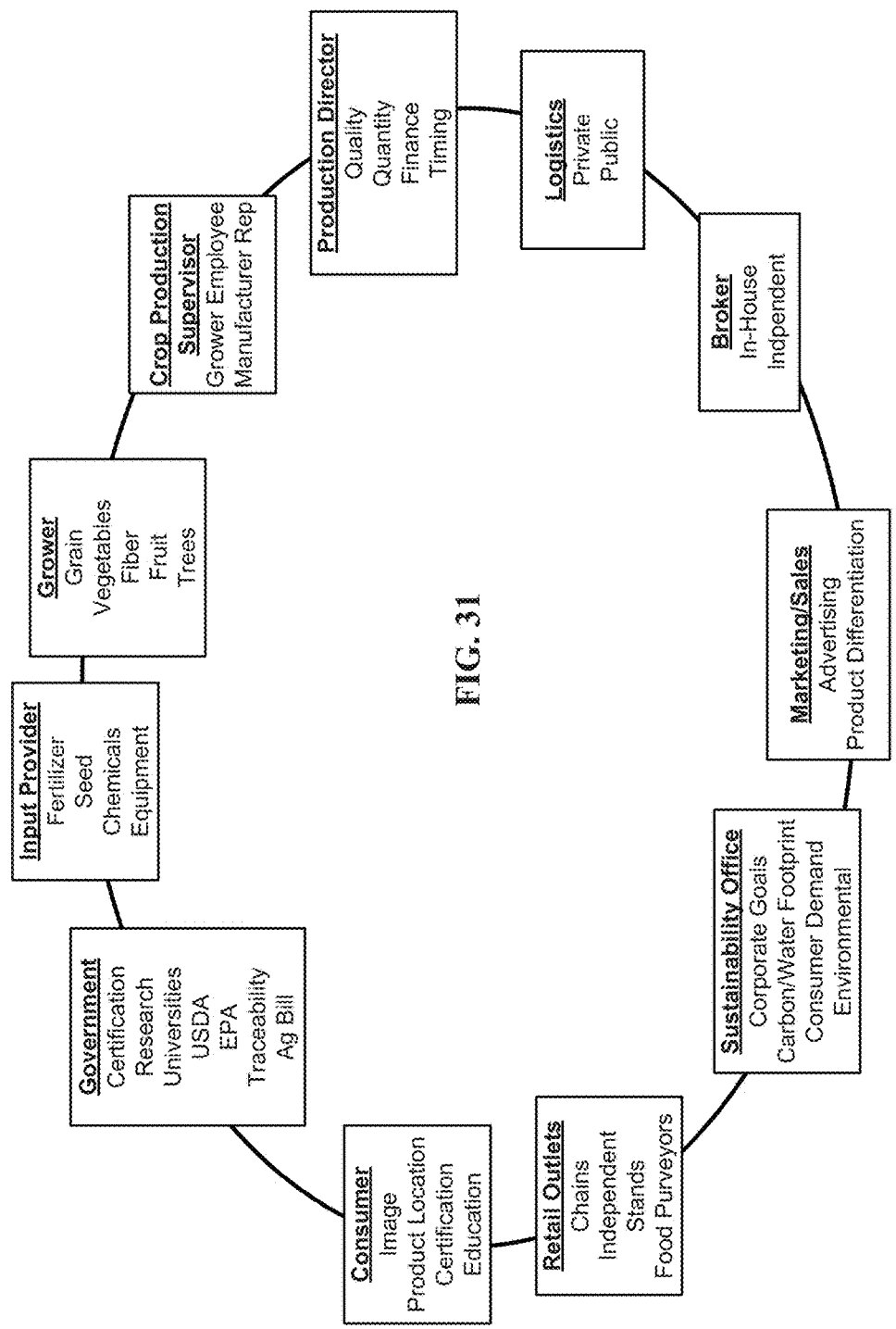
FIG. 31 illustrates an exemplary food supply chain in accordance with aspects of the subject disclosure.

In another aspect, the methods and systems provided herein, as well as the data generated in the methods and systems provided herein, can provide a ranking of a grower's performance while growing a crop. In an aspect, the ranking can be determined by comparing the grower's water use versus a water use reported by the USDA or references such as Knott's Handbook for Vegetable Growers (and adjusted for the progression of the crop through the season). It is contemplated that as Adviroguard™ software builds a database over several growing seasons, a grower's performance in the current year can be compared with previous seasons of a range of growers in the same or in comparable regions with similar soil types. A grower's overall environmental performance ("daily ranking") can also be compared by calculating water use (uptake by the crop through $TX_{RET_O}$) compared to ETo, as well as by checking for leaching after an irrigation event or rainfall. FIG. 31 illustrates an example of the manner in which these various measurements can be used by the entire food supply chain. More particularly, FIG. 31 illustrates each participant in the food supply chain, and provides examples of how the methods and systems provided herein can be utilized. In an aspect, the food supply chain can begin with an input provider who can provide various materials such as fertilizer, seed, chemicals, and equipment to a grower. The methods and systems described herein can be used to monitor and track the materials, as well as to monitor and track the use of the materials. Next in the food supply chain can be a grower. The grower can grow various crops, including, but not limited to grain, vegetables, fiber, fruit, or trees. In an aspect, the methods and systems described herein can be used by the grower to track and manage aspects of the growing process, and to provide crop management data to a consumer. From the grower, the food supply chain can continue with a crop production supervisor who can be, for example, an employee of the grower or a representative of a manufacturer. From there, the food supply chain can continue with a production director. The production director can utilize the methods and systems described herein to oversee various aspects of crop production, including, but not limited to, quality of the crop, quantity of the crop, finance of the crop, or timing of the crop. Logistics can be next in the food supply chain. Logistics can be either public or private logistics. The methods and systems provided can be utilized to modify the logistics channels utilized for product distribution based on data analysis and feedback from other participants in the food supply chain. From there the food supply chain can continue with a broker. The broker can be, for example, an in-house broker or an independent broker. Next in the food supply chain can be an entity that can oversee marketing or sales. Marketing or sales can include, but is not limited to advertising or product differentiation. From there the food supply chain can continue with a sustainability office. For example, and not to be limiting, the sustainability office can utilize the methods and systems provided herein to oversee corporate goals, carbon footprint, water footprint, consumer demand, or environmental aspects. Next in the food supply chain can be a retail outlet. The retail outlet can be, but is not limited to a chain store, an independent seller, a produce stand, or a food purveyor. In an aspect, a retail outlet can use the methods and systems provided herein to monitor and track the transport of a product from a grower, through the supply chain, to the retail store. From there, the supply chain can continue with a consumer. In an aspect, a consumer can use the methods and systems described herein to determine, for example, product image, product location, or product certification, or to receive product education. Government can play a role in every level of the food supply chain. In an aspect, government can utilize the methods and systems described herein to determine product certification, for product research, or to trace and locate a product in the supply chain. In another aspect, the methods and systems provided herein can be used by universities or regulatory agencies such as the USDA or the EPA, or can be used in enforcement of legislation such as the Ag Bill.

Figure 32:
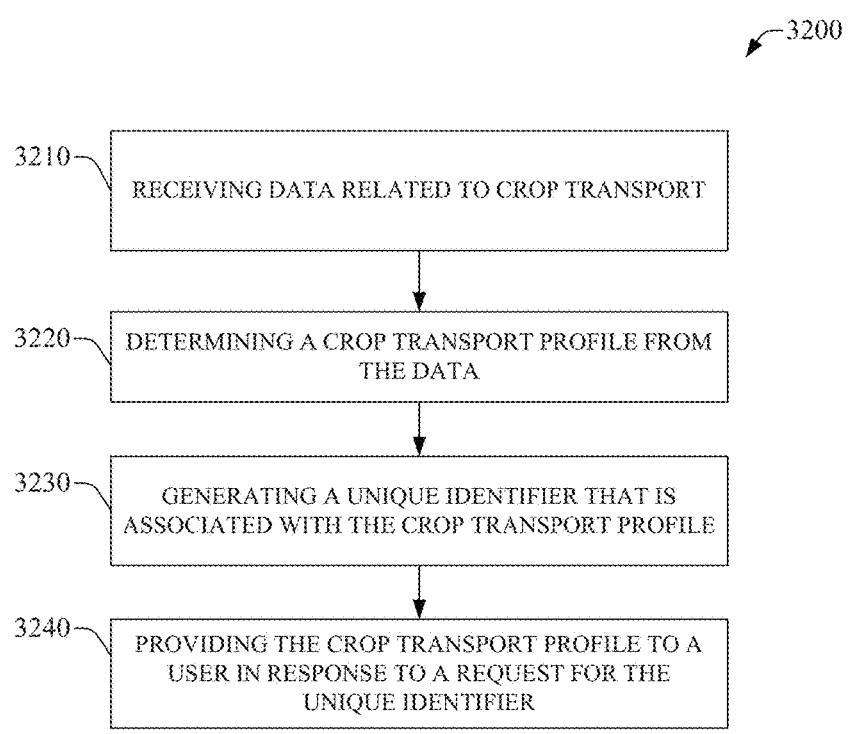
FIG. 32 illustrates an exemplary method for providing a crop transport profile to a user in accordance with aspects of the subject disclosure.

In another aspect, illustrated in FIG. 32, provided are methods and systems for determining a crop transport profile and providing the crop transport profile to a user. More particularly, in an aspect, the method 3200 can comprise receiving data related to crop transport 3210; determining a crop transport profile from the data 3220; generating a unique identifier that is associated with the crop transport profile 3230; and providing the crop transport profile to a user in response to a request for the unique identifier 3240. In an aspect, a bar code, an RFID tag, a QR code, or another symbol can be associated with the crop transport profile and can be affixed to a product at the time of harvest, thereby enabling the product to be followed through its chain of custody. In another aspect, the crop transport profile can be provided to a user in response to a request for the unique identifier by displaying the crop transport profile to the user at a kiosk or a website. For example, and not to be limiting, the website can be a social networking website such as Facebook, Twitter, LinkedIn, and the like.

During produce transport, packing house manipulations, including, but not limited to cleaning, sorting, grading, and packaging, rely on movement of the produce using flumes. Thus, managing the cleanliness of the produce and the water used to clean the produce, requires measurement of the oxidation-reduction potential (ORP), the pH, and the sanitizer content. This data can be collected and managed during these operations. Thus, in an aspect, data related to crop transport can comprise data obtained during packing house crop manipulation. This data can include, but is not limited to, water cleanliness, oxidation-reduction potential, pH, sanitizer content, or microbial testing results.

Furthermore, measurements, such as time and temperature, obtained during the packing house stage, as well as subsequent transport stages can have an effect on nutrition, taste, and food safety. In an aspect, crop transport data can be collected during these operations, and received from a plurality of portable sensors that can transmit data continuously and can time-stamp product as it is handed off at the packing house loading dock, the distribution center, and the retail store or restaurant kitchen. From this crop transport data, a crop transport profile can be determined that can comprise microbial loads, taste levels, and remaining shelf-life for each produce product. In another aspect, the crop transport profile determined from the microbial, nutritional, or flavor-related testing data, performed at any stage along the supply chain, can be associated with a unique identifier that can further be associated with a symbol, for example, and not to be limiting, a bar code, an RFID tag, or a QR code, and can be made available to a consumer upon request.

Thus, by the methods and systems provided herein, the performance and safety of the entire supply chain can be monitored and calculated, based on consumer demand. In an aspect, the methods and systems provided herein enable data-driven outcomes of management practices that can be managed "on the fly" based on weather events, pest outbreaks, and water availability. The methods and systems provided herein, in addition to Adviroguard™, represent a collection of tools that can bring data to bear on every participant in the food supply chain (see, e.g., FIG. 31).

In another aspect, the crop management and crop transport profiles described herein can be used in a search by a consumer to identify products for purchase. More particularly, by engaging the retail and food service segments of the food supply chain and identifying products marked with the Nature's Eye name or symbol, a consumer can access the metrics and profiles described herein to search for products for purchase. To that end, the methods and systems described herein can be used to translate the outcomes calculated from collected data by Adviroguard™ software into language and displays that can be understood by a consumer, as well as others in the supply chain, and can indicate the benefits to society that are accrued by water and energy savings through fertilizer and crop protection applications, and tillage. Thus, the methods and systems described herein can result in improvements in production and profitability for the grower as well as improvements in sustainability and accountability that are desired by consumers.

Figure 33:
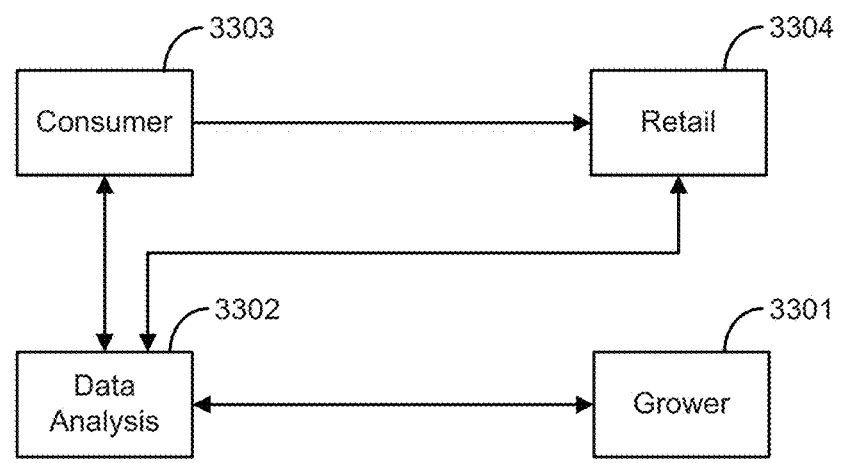
FIG. 33 illustrates exemplary relationships in a feedback environment.

In another aspect, provided are methods and systems for utilizing consumer feedback to influence product sales, crop management, and crop transport. FIG. 33 illustrates exemplary relationships in such a feedback system. Grower 3301 can provide data to data analysis provider 3302. The data can comprise any type of data previously described herein. The data analysis provider can provide information to consumer 3302 regarding crop management and/or crop transport as described herein. Retailer 3304 can obtain purchasing data and associate the purchasing data with crop management and/or crop transport data. Retailer 3304 can provide the associated purchasing data to data analysis provider 3302. Data analysis provider 3302 can analyze the purchasing data and identify relationships and trends as they pertain to the crop management and/or crop transport data. For example, data analysis provider 3302 can determine consumer preferences based on crop transport times, pesticides used or not used, crop origin, and any other parameter obtained from crop management and/or crop transport data. Such data can be provided to retailer 3304 so that retailer 3304 can modify product placement, product purchases, preferred suppliers, and the like. Such data can be provided to grower 3301 so that retailer grower 3301 can modify crop management and crop transport.

In another aspect, provided are methods and systems that can assist a grower in participating in a product recall. More particularly, the methods and systems described herein can enable the grower to track water, fertilizer, and crop protection applications, which are data that can be taken into account when performing root-cause analysis of food safety incidents or other product issues.

The methods and systems described herein have value for consumers and marketers. In an aspect, the methods and systems described herein can be used to look at crop management and crop transport data, and present it in such a way that enables consumers to understand how a product, including, for example, a fruit or a vegetable, has been grown with the least amount of impact to the environment. This can be accomplished, for example, by monitoring efficiencies, including, but not limited to, water efficiency and nutrient efficiency in $ET_0$. In another aspect, efficiencies can be measured by creating a baseline. For example, Adviroguard™ can be used to create a baseline for a grower, and data collected for that grower can then be used in future years to see if the progress of certain calculations are improving, staying the same, or getting worse.

In an aspect, the methods and systems provided herein can be classified into two components. First is transparency of the product lifecycle. That is the ability to connect the flow of a product or product lifecycle by receiving data from all of the stakeholders that touch that product. For example, the fertilizer company can sell a fertilizer to a grower and that has marked the grower. The grower then puts the fertilizer on his crop and converts it to an efficiency and that efficiency can be attached to the grower's produce. The grower's produce can then be sent to a processor where it can be processed into another product and that efficiency can be attached to that new product. In an aspect, the new product can go through another process and the efficiency can be carried to further new products. Ultimately, in an aspect, the consumer can go online, or to a kiosk, and can use a code or symbol associated with a unique identifier, that can be in turn associated with the end product, and can cross reference all of the steps that the end product went through including, but not limited to, who grew the product, how long the product has been in the system, the parties that touched, and other information of that nature. Thus, the consumer can be provided with a biography based on the background of how its food was grown, and this is the transparency provided by the methods and systems described herein.

The second aspect can be a certification. Generally, when growers do not collect information and data electronically, they are asked to provide how much water they put on the crop, whether or not bleaching occurs, and things of that nature. Thus, for example, often growers are not certain if their irrigation practices result in bleaching. As a result, they report that they only a suppose bleaching occurs or that it does not occur. Certification can play a role, for example, in that the technology, methods, and systems described herein can verify whether or not bleaching is occurring. This information can then be associated the product's unique identifier and provided to a consumer so that the consumer knows that when this product touts that it does bleach nutrients into the well water table, there is independent third-party electronic data that confirms this assertion. Thus, the methods and systems described herein represent an improvement in the traditional data collection process.

In an aspect several other growth and transport parameters can be verified. For example, and not to be limiting, the temperature at which a product was transported can be documented, the time the product spends in a warehouse can be documented, the number of miles a product travels can be documented, or the number of times a product changes hands or owners can be documented. This type of data can then be combined with data from the grower, such as efficiencies and rankings, and can convey information to the consumer without overloading the consumer with data. Thus, the methods and systems provided herein can be a marketing tool as well as a selling product.

In another aspect, the methods and systems provided herein can provide unbiased, third-party documentation regarding sustainability and, as a result, can measure and quantify things that cannot be done on the marketing side. For example, in an aspect, the methods and systems provided herein can be used to show that water is not being wasted and that the water used is being used in the most efficient way possible. As a result, water supplies can be increased for other uses or can be more easily conserved. Thus, sustainability can be defined and can be made compatible with farming practices.

Additionally, in the current system of produce distribution, ownership and transfer of a product can be lost, but the consumer does not to have access to this information and, as such, they are in essence buying blind. Accordingly, in an aspect, the methods and systems described herein allow the product to be followed all way through the transport and distribution process. In another aspect, the methods and systems provided herein can utilize a unique product identifier that can go all the way through the transport and distribution process and can additionally provide information to a consumer regarding how seed was created, how fertilizer was produced, and even how a product was consumed, thereby creating a full picture of a product's lifecycle.

In an aspect, Adviroguard™ can be the first phase of the crop management data collection process. In another aspect, a grower can input, for example online, crop management data not electronically collected. That data can be, but is not limited to, the amount of man-hours used to plant the crop. The data from both data-collection sets can then be compiled and analyzed. In an aspect the crop management data can be analyzed by Adviroguard™ and a consumer can be provided with a crop management profile that can illustrate whether the crop was grown using the best environmental method. Thus factors such as water efficiency, nutrient efficiency, and water table leaching can be used by the consumer in making a decision as to whether not he wants to buy a product. In another aspect. Adviroguard™ can touch many facets of the product lifecycle, for example, the grower that says he produces a crop at 99% efficiency, or the retail outlets or sellers of the produce. The methods and systems described herein can provide consumers with transparency of those facets of the lifecycle.

Additionally, the methods and systems provided herein can provide transparency without data overload. In an aspect, Adviroguard™ can collect millions of pieces of data in what may be a one-trip product lifecycle; however, the methods and systems provided herein provide consumers with a means to make sense of that data. For example, and not to be limiting, the consumer can use the crop management and crop transportation profiles as a ranking system for comparison or as a means to determine where a particular product stands in the marketplace. Thus, Adviroguard™ can analyze the numbers to find trends and can determine crop management and crop transport profiles and then can get that information to the consumer, or to other people throughout the product's lifecycle. In another aspect, the crop management and crop transport profiles can be used to create benchmarks for management and sustainability. For example, the methods and systems provided herein can be used as a mechanism to measure the progression of improvements and to show that the growers or the stakeholders in a product are doing what is necessary to improve sustainability and help the environment. In another aspect, the crop management and crop transport profiles determined in the methods and systems provided herein can be used create a database. The database can include, but is not limited to, data rankings and data efficiencies.

The methods and systems described herein can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   (a) receiving, at a computing device coupled to an irrigation system, a first plurality of soil moisture readings related to a resource availability in the soil from a first sensor at a first location in a field;
   (b) determining, with the computing device, a first metric based at least on a difference between a first soil moisture reading in the first plurality of soil moisture readings and a second soil moisture reading in the first plurality of soil moisture readings, wherein the first metric comprises an intensity of a change in the resource availability;
   (c) determining, with the computing device, and storing into a memory, at least one of a magnitude of a value of the first metric or a sign of the value of the first metric;
   (d) repeating, with the computing device, steps b and c for a pre-determined number of soil moisture readings;
   (e) determining, with the computing device, a first characteristic of the soil based on at least one of the stored magnitudes or the stored signs of the first metric;
   (f) receiving, with the computing device, a second plurality of soil moisture readings related to the resource availability in the soil from a second sensor at a second location in the field;
   (g) determining, with the computing device, a second metric based at least on a difference between a first soil moisture reading in the second plurality of soil moisture readings and a second soil moisture reading in the second plurality of soil moisture readings, wherein the second metric comprises an intensity of a change in the resource availability at the second location;
   (h) determining, with the computing device, a magnitude of a value of the second metric and a sign of the value of the second metric;
   (i) determining, with the computing device, a second characteristic of the soil comprising a cause of the change in the resource availability based on the magnitudes and the signs of the values of the second metric, wherein the magnitudes and the signs of the values of the second metric are monitored at the second sensor during and after an irrigation period or event; and
   (j) optimizing with the computing device a duration of a subsequent irrigation period of the irrigation system based on one or more of the first characteristic of the soil or the second characteristic of the soil by either lengthening or shortening the duration of the subsequent irrigation period until predetermined magnitudes and signs of the values of one or more of the first metric or the second metric are achieved.

2. The method of claim 1, wherein the plurality of soil moisture readings related to a resource availability in the soil is received from a plurality of sensors located in the field.

3. The method of claim 1, wherein the resource is moisture.

4. The method of claim 1, wherein the pre-determined number of soil moisture readings comprises all of the first plurality of soil moisture readings.

5. The method of claim 1, wherein determining, with the computing device, the characteristic of the soil based on at least one of the stored magnitudes or the stored signs of the first metric comprises determining a maximum magnitude of negative metric magnitude values.

6. The method of claim 1, wherein the one or more of the first characteristic of the soil or the second characteristic of the soil comprises one or more of field capacity, leaching factor, Gilbert Effect, optimum soil ratio of water and air, root management zone, root-derived Evaporation-Transpiration Coefficient (ETo), irrigation efficiency, plant ETo coefficient, drip irrigation management, stress days, plant water efficiency, ion distribution and drift, ion minimum and maximum, water and nutrient application ranking, total irrigation, or total rainfall.

7. The method of claim 1, further comprising:
 (k) receiving, in real time, soil moisture readings related to resource availability in the soil from a plurality of soil moisture reading sites;
 (l) formatting the soil moisture readings into a common data format; and
 (m) supplying the formatted soil moisture readings to an analysis platform.

8. The method of claim 1, wherein the plurality of soil moisture readings comprise time-stamped resource measurements from a plurality of soil depths.

9. The method of claim 8, wherein determining, with the computing device, a first metric based at least on a difference between a first soil moisture reading in the first plurality of soil moisture readings and a second soil moisture reading in the first plurality of soil moisture readings comprises subtracting a value of the first soil moisture reading from a value of the second-soil moisture reading, wherein the second soil moisture reading occurred later in time than the first soil moisture reading.

10. A system, comprising:
 an irrigation system configured to supply water to a field;
 a first sensor at a first location in the field;
 a second sensor at a second location in the field;
 a memory comprising a plurality of computer-executable instructions; and
 a processor coupled to the memory and configured to carry out the steps of:
 (a) receiving a first plurality of soil moisture readings related to a resource availability in the soil from a first sensor;
 (b) determining a first metric based at least on a difference between a first soil moisture reading in the first plurality of soil moisture readings and a second soil moisture reading in the first plurality of soil moisture readings, wherein the first metric comprises an intensity of a change in the resource availability;
 (c) determining, and storing in the memory, at least one of a magnitude of a value of the first metric or a sign of the value of the first metric;
 (d) repeating the steps (b) and (c) for a pre-determined number of soil moisture readings;
 (e) determining a first characteristic of the soil based on at least one of the stored magnitudes or the stored signs of the first metric;
 (f) receiving a second plurality of soil moisture readings related to the resource availability in the soil from the second sensor;
 (g) determining a second metric based at least on a difference between a first soil moisture reading in the second plurality of soil moisture readings and a second soil moisture reading in the second plurality of soil moisture readings, wherein the second metric comprises an intensity of a change in the resource availability at the second location; and
 (h) determining a magnitude of a value of the second metric and a sign of the value of the second metric;
 (i) determining a characteristic of the medium comprising a cause of the change in the resource availability based on the magnitudes and the signs of the values of the second metric, wherein the magnitudes and the signs of the values of the second metric are monitored at the second sensor during and after an irrigation period or event; and
 (j) optimizing a duration of a subsequent irrigation period based on one or more of the first characteristic of the soil or the second characteristic of the soil by either lengthening or shortening the duration of the subsequent irrigation period until predetermined magnitudes and signs of the values of one or more of the first metric or the second metric are achieved.

11. The system of claim 10, wherein the first plurality of soil moisture readings related to a resource availability in the soil is received from a plurality of sensors.

12. The system of claim 10, wherein the processor is further configured to carry out the steps of:
 receiving, in real time, soil moisture readings related to resource availability in the soil from a plurality of soil moisture reading sites;
 formatting the soil moisture readings into a common data format; and
 supplying the formatted soil moisture readings to an analysis platform.

13. The system of claim 10, wherein the resource is moisture.

14. The system of claim 10, wherein the plurality of soil moisture readings comprise time-stamped resource measurements from a plurality of soil depths.

15. The system of claim 10, wherein the one or more of the first characteristic of the soil or the second characteristic of the soil comprises one or more of field capacity, leaching factor, Gilbert Effect, optimum soil ratio of water and air, root management zone, root-derived Evaporation-Transpiration Coefficient (ETo), irrigation efficiency, plant ETo coefficient, drip irrigation management, stress days, plant water efficiency, ion distribution and drift, ion minimum and maximum, water and nutrient application ranking, total irrigation, or total rainfall.

* * * * *